US012579990B2

(12) United States Patent
Nagisetty et al.

(10) Patent No.: US 12,579,990 B2
(45) Date of Patent: Mar. 17, 2026

(54) ENCODING DEVICE, DECODING DEVICE, ENCODING METHOD, AND DECODING METHOD

(71) Applicant: Panasonic Intellectual Property Corporation of America, Torrance, CA (US)

(72) Inventors: Srikanth Nagisetty, Singapore (SG); Chong Soon Lim, Singapore (SG); Hiroyuki Ehara, Kanagawa (JP); Akira Harada, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 149 days.

(21) Appl. No.: 18/712,143

(22) PCT Filed: Oct. 14, 2022

(86) PCT No.: PCT/JP2022/038297
§ 371 (c)(1),
(2) Date: May 21, 2024

(87) PCT Pub. No.: WO2023/100494
PCT Pub. Date: Jun. 8, 2023

(65) Prior Publication Data

US 2025/0022478 A1 Jan. 16, 2025

(30) Foreign Application Priority Data

Dec. 1, 2021 (JP) ................................ 2021-195488

(51) Int. Cl.

*G10L 19/038* (2013.01)
*G10L 19/002* (2013.01)
*G10L 19/00* (2013.01)

(52) U.S. Cl.
CPC .......... *G10L 19/038* (2013.01); *G10L 19/002* (2013.01); *G10L 2019/0005* (2013.01)

(58) Field of Classification Search
CPC ... G10L 19/038; G10L 19/032; G10L 19/002; G10L 2019/0005; G10L 19/00; H03M 7/3082; H03M 7/30; H04N 19/94
See application file for complete search history.

(56) References Cited

U.S. PATENT DOCUMENTS

2008/0015852 A1* 1/2008 Kruger .................... G10L 19/12 704/E19.035
2014/0249806 A1 9/2014 Liu et al.
(Continued)

FOREIGN PATENT DOCUMENTS

JP 6027538 11/2016
WO 2013/061531 5/2013
(Continued)

OTHER PUBLICATIONS

"Codec for Enhanced Voice Services (EVS); Detailed Algorithmic Description (Release 16)", TS 26.445 V16.0.0, 2019-06.
(Continued)

*Primary Examiner* — Huyen X Vo
(74) *Attorney, Agent, or Firm* — Greenblum & Bernstein, P.L.C.

(57) ABSTRACT

An encoding device comprising: a quantization circuit that generates a quantization parameter that includes information about a vector quantization codebook; and a control circuit that sets the number of available bits according to conditions for encoding based on the difference between the number of bits available for encoding of the target sub-vector and the number of bits for the quantization parameter of the target sub-vector.

12 Claims, 29 Drawing Sheets

(56) References Cited

U.S. PATENT DOCUMENTS

| | | | | |
|---|---|---|---|---|
| 2015/0025879 | A1* | 1/2015 | Liu | G10L 19/16 704/230 |
| 2024/0177723 | A1* | 5/2024 | Nagisetty | H03M 7/3082 |

FOREIGN PATENT DOCUMENTS

| | | |
|---|---|---|
| WO | 2013/118476 | 8/2013 |
| WO | 2022/201632 | 9/2022 |

OTHER PUBLICATIONS

International Search Report issued in International Pat. Appl. No. PCT/JP2022/038297, dated Jan. 10, 2023, along with an English translation thereof.

Extended European Search Report dated Mar. 3, 2025 issued in European patent application No. 22900928.

* cited by examiner

| CODEBOOK NUMBER | CODEBOOK | CODEBOOK INDICATOR | NUMBER OF BITS USED BY CODEBOOK INDICATOR | NUMBER OF BITS USED BY CODEVECTOR INDEX | TOTAL NUMBER OF BITS USED |
|---|---|---|---|---|---|
| 0 | Q0 | 0 | 1 | 0 | 1 |
| 2 | Q2 | 10 | 2 | 8 | 10 |
| 3 | Q3 | 110 | 3 | 12 | 15 |
| 4 | Q4 | 1110 | 4 | 16 | 20 |
| 5 | Q5 | 11110 | 5 | 20 | 25 |
| ⋮ | ⋮ | ⋮ | ⋮ | ⋮ | ⋮ |

FIG. 1

| NUMBER OF UNUSED BITS | 0 | 1–5 | 6–10 | 11–15 | 16–20 | 21–25 | 26–30 | … |
|---|---|---|---|---|---|---|---|---|
| CODE EXAMPLE | 0 | 10 | 110 | 1110 | 11110 | 111110 | 1111110 | … |
| NUMBER OF BITS | 1 | 2 | 3 | 4 | 5 | 6 | 7 | … |

FIG. 10

ENCODING DEVICE, DECODING DEVICE, ENCODING METHOD, AND DECODING METHOD

TECHNICAL FIELD

The present disclosure relates to an encoding apparatus, a decoding apparatus, an encoding method, and a decoding method.

BACKGROUND ART

Multi-rate lattice vector quantization is one of quantization methods in encoding audio or voice (for example, encoding an excitation signal) (see, for example, NPL 1). Multi-rate lattice vector quantization may be applied to, for example, split vector quantization (which is called, for example, split multi-rate lattice vector quantization or split multi-rate lattice vector quantization). Also, split multi-rate lattice vector quantization may be applied to, for example, algebraic vector quantization (AVQ).

CITATION LIST

Patent Literature

PTL 1
WO 2013/061531

Non-Patent Literature

NPL 1
3GPP TS 26.445 V16.0.0, “Codec for Enhanced Voice Services (EVS); Detailed Algorithmic Description (Release 16)”, 2019 June.

SUMMARY OF INVENTION

There is room for study in a method of reducing the number of bits for encoding in multi-rate lattice vector quantization.

Non-limiting embodiments of the present disclosure facilitate providing an encoding apparatus, a decoding apparatus, an encoding method, and a decoding method that reduce the number of bits for encoding in vector quantization.

An encoding apparatus according to an embodiment of the present disclosure includes: quantization circuitry, which, in operation, generates quantization parameters including information on a codebook for vector quantization; and control circuitry, which, in operation, configures, in encoding of a difference between a number of available bits for quantizing a targeted sub-vector and a number of bits of the quantization parameters of the targeted sub-vector, the number of available bits depending on a condition.

It should be noted that general or specific embodiments may be implemented as a system, an apparatus, a method, an integrated circuit, a computer program, a storage medium, or any selective combination thereof.

According to an embodiment of the present disclosure, it is possible to reduce the number of bits for encoding in multi-rate lattice vector quantization.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 is a table showing an example of a codebook list in split multi-rate lattice vector quantization;

FIG. 10 is a table showing an example of a correspondence relationship between the number of unused bits and an unused bits encoding code;

DESCRIPTION OF EMBODIMENTS

Figure 2:
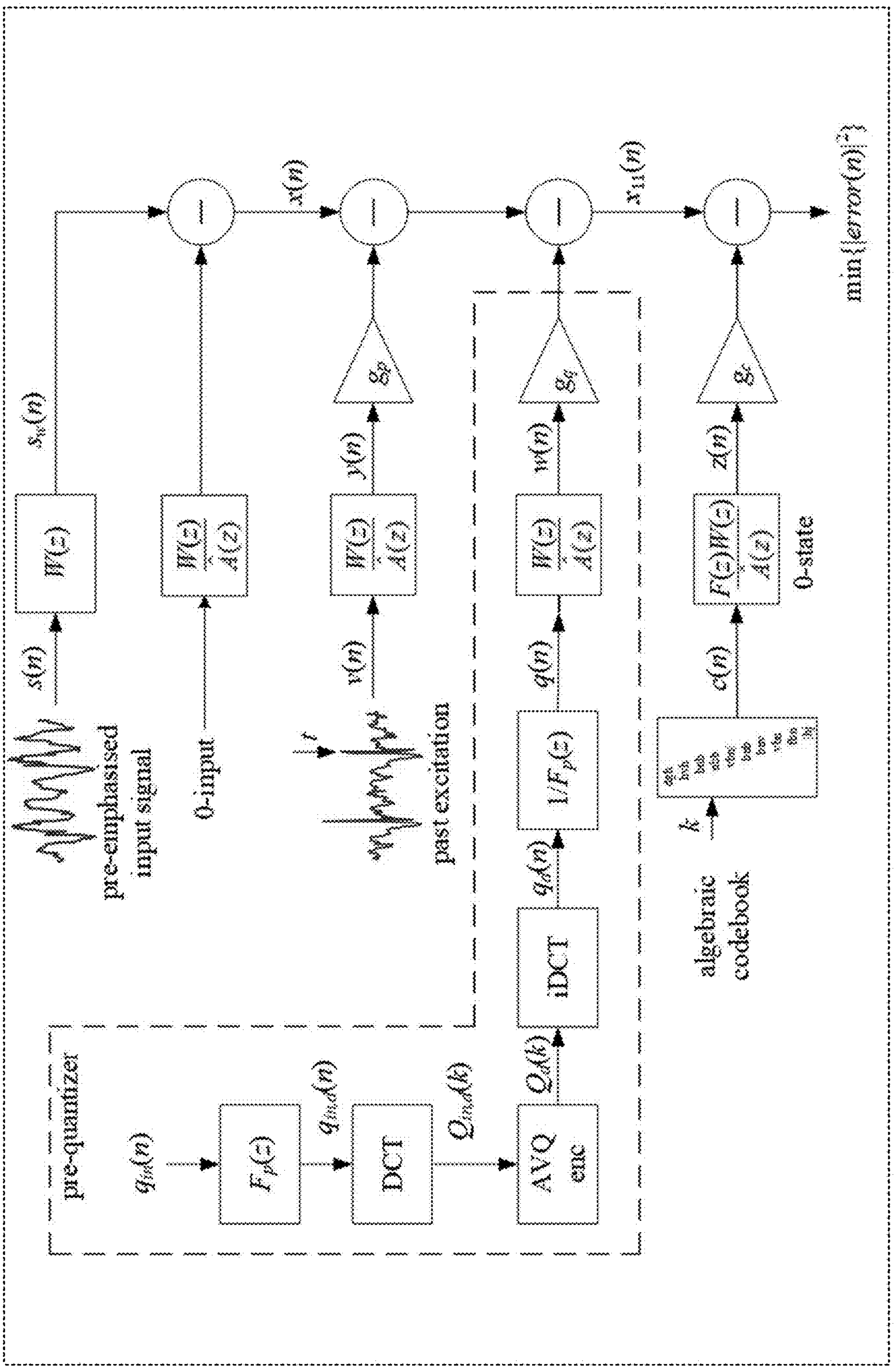
FIG. 2 is a block diagram showing an example of the configuration of part of an algebraic code excited linear prediction (ACELP) encoder in an enhanced voice services (EVS) codec.

Hereinafter, embodiments of the present disclosure will be described in detail with reference to the accompanying drawings.

For example, in split multi-rate lattice vector quantization, a signal in a time domain or a frequency domain (or a spectral domain) may be split into a plurality of sub-vectors (SVs; also referred to as sub-bands or sub-blocks), and each of the plurality of split sub-vectors may be subjected to multi-rate lattice vector quantization.

FIG. 1 is a table showing an example of a list of codebooks (or referred to as codebooks) in multi-rate lattice vector quantization for sub-vectors (see, for example, PTL 1 or NPL 1).

For example, as shown in FIG. 1, quantization parameters in split multi-rate lattice vector quantization may include information for identifying a codebook to be used in quantization (referred to as, for example, a codebook indicator or a codebook index) and information for identifying a codevector selected from among a plurality of codevectors included in the codebook (referred to as, for example, a codevector index).

For example, in each of the codebooks Q0, Q2, Q3, Q4, Q5, . . . , Qn shown in FIG. 1, 1, 10, 15, 20, 25, . . . , or 5n bits (n is an integer greater than or equal to two) can be used to encode (or quantize) one sub-vector (SV). Of the number of bits used for encoding using each codebook (for example, the total number of bits used), 1, 2, 3, 4, 5, . . . , or n bits (n is an integer greater than or equal to two) may be used for a codebook indicator. In other words, in FIG. 1, the ratio of the number of bits allocated to encoding a codebook indicator to the total number of bits used for encoding using each codebook (for example, 5n and n each are an integer greater than one) may be ⅕.

The codebook Q0 may include one vector (for example, a zero vector or a null vector). A zero vector, for example, means that a quantization value of a vector is zero. Thus, in the codebook Q0, a codevector index does not need to be defined, and the number of bits used for a codevector index may be zero. In the codebook Q0, for example, one bit may be used for a codebook indicator.

For example, an encoding apparatus (encoder) may collectively encode a plurality of sub-vectors (for example, eight SVs in NPL 1) by using the codebooks shown in FIG. 1. The number of bits available for encoding a plurality of sub-vectors (for example, referred to as the total number of bits) may be known between the encoding apparatus and a decoding apparatus (decoder).

For example, PTL 1 suggests a method of reducing bits in split multi-rate lattice vector quantization for eight SVs in an example. For example, of eight SVs, in accordance with the number of bits used for seven SVs, a codebook indicator (codebook index) used for the remaining one SV is estimated in accordance with the following Expression 1 (see, for example, PTL 1).

$$cb'fix = \left(\text{Bits}_{available} - \sum_{i \neq P_{fix}} \text{Bits}_{cbvi}\right)/5 \qquad \text{(Expression 1)}$$

In the Expression 1, cb'fix denotes an estimated value of the number of bits used by a codebook indicator for one SV (for example, sub-vector number i=Pfix), $\text{Bits}_{available}$ denotes the total number of bits available for encoding eight SVs, and $\Sigma\text{Bits}_{cbvi}$ denotes the sum of the numbers of bits used in encoding for the other seven sub-vectors vi (i≠Pfix) different from the sub-vector number i=Pfix (for example, the total number of bits used in FIG. 1).

In PTL 1, the encoding apparatus, for example, quantizes (or encodes) a difference between the estimated value cb'fix of the number of bits used by the codebook indicator shown in the Expression 1 and the number of bits of an actual codebook indicator for one SV (for example, i=Pfix), and transfers the differential information to the decoding apparatus. For example, as the codebook number n used for one SV increases, information content (for example, the number of bits) of the above-described differential information reduces with respect to the codebook indicator, and the number of bits for encoding is reduced.

In PTL 1, for example, there is a case where differential information (in other words, encoding target) is a negative number (for example, −1), and a quantization level or code for a negative number is used, so encoding (or quantization) can be more complicated.

Also, when one identified SV is encoded by using the codebook Q0 (for example, codebook indicator "0") or the codebook Q2 (for example, codebook indicator "1") under special conditions, there is a possibility that it is not possible to reduce the number of bits for encoding.

Here, a special case may be, for example, a case where, of the total number of bits available for encoding, there is no bit not used for encoding and all the bits are used for encoding. In this case, for example, in FIG. 1, of a plurality of bits that indicate a codebook indicator of each codebook, the last digit "0" (for example, also referred to as stop bit) may be omitted. For example, in a special case, the codebook indicator of the codebook Q2 may be "1" (1 bit) obtained by removing "0" from "10".

When, for example, reduction of bits of an SV with a larger number of bits used for encoding of a plurality of SVs is focused, there is a possibility that it is not possible to reduce the number of bits for encoding when there occurs an SV of which the number of bits used for encoding is zero (for example, an SV that is not encoded due to an insufficient number of bits available). An SV of which the number of bits used for encoding is zero tends to be, for example, a high-range SV of the plurality of SVs (for example, the sixth, seventh, or eighth SV of the eight SVs).

In an embodiment of the present disclosure, a method of reducing the number of bits for encoding, used to encode (in other words, variable-length code) a codebook indicator in multi-rate lattice vector quantization (lattice VQ (LVQ)) applied to split vector quantization (for example, split VQ (SVQ)) will be described.

Hereinafter, in an example, enhanced voice services (EVS) codec in which multi-rate lattice vector quantization is used as AVQ will be described. Here, an example in which AVQ is used for vector quantization of discrete cosine transform (DCT) coefficients will be described. The configuration is not limited to quantization and encoding of DCT coefficients (in other words, frequency domain). For example, AVQ (or multi-rate lattice vector quantization) is also applicable to vector quantization in a time domain.

Hereinafter, in an example, a case where the number of sub-vectors split in AVQ is set to eight (for example, SV1 to SV8) will be described. The number of sub-vectors split is not limited to eight and may be another number.

Embodiment 1

[Example of Configuration of Encoding Apparatus]

Figure 3:
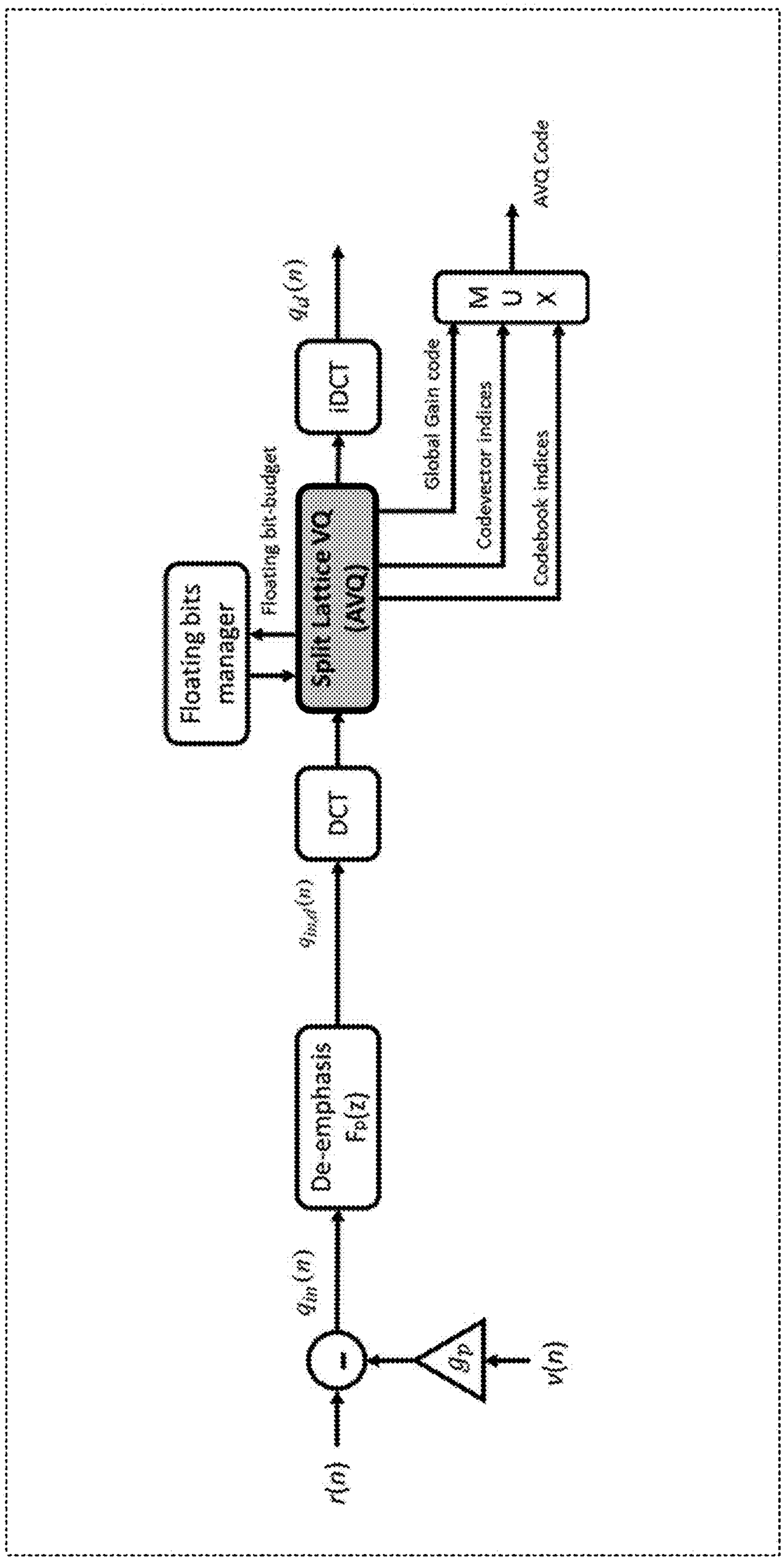
FIG. 3 is a block diagram showing an example of the configuration related to algebraic vector quantizer (AVQ) encoding in the EVS codec.
Figure 29:
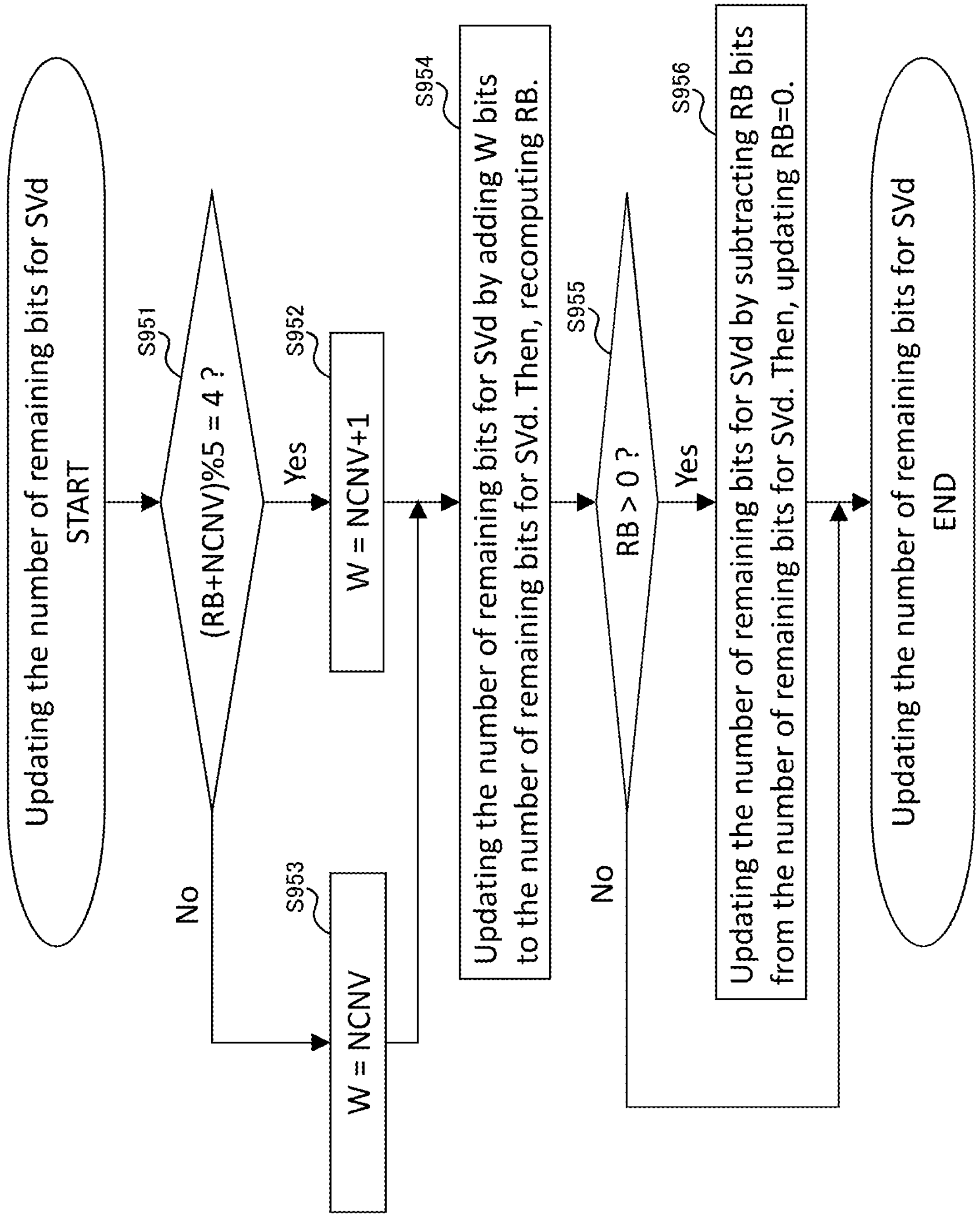
FIG. 29 is a flowchart showing another example of the process of updating the number of bits remaining as the bit stream for the code conversion-targeted sub-vector.

FIG. 2 is a block diagram showing an example of the configuration of an EVS-codec algebraic code excited linear prediction (ACELP) encoding apparatus (for example, FIG. 29 of NPL 1). FIG. 3 is a block diagram showing signal processing related to, for example, an AVQ encoder in FIG. 2. An embodiment of the present disclosure is applicable to, for example, encoding of codebook indicators (codebook indices) output from the AVQ encoder (AVQ enc block or Split Lattice VQ block) in FIGS. 2 and 3.

Figure 4:
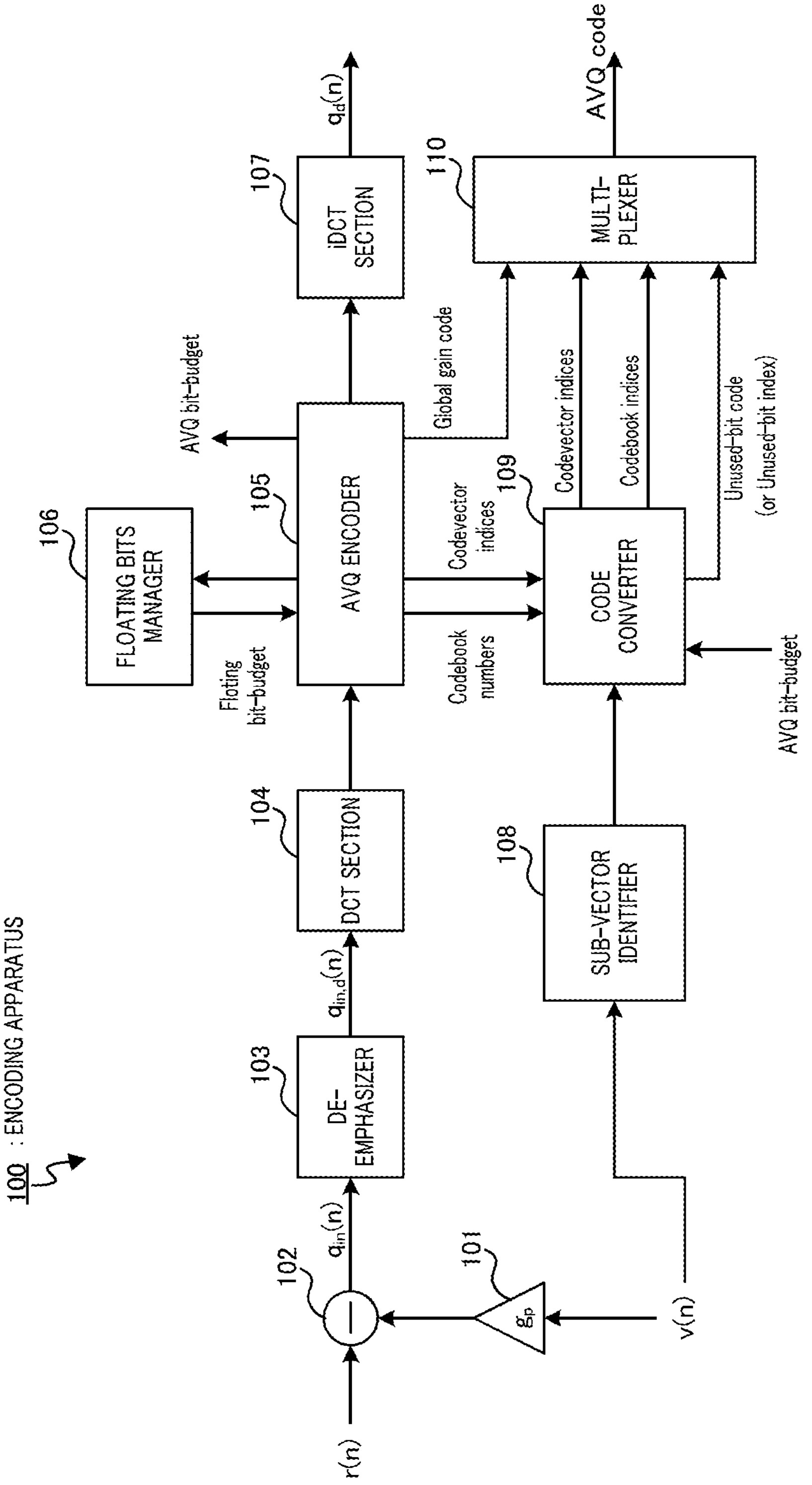
FIG. 4 is a block diagram showing an example of the configuration of an encoding apparatus according to Embodiment 1.

FIG. 4 is a block diagram showing an example of the configuration of signal processing related to AVQ encoder (hereinafter, referred to as encoding apparatus for the sake of convenience) 100 according to an embodiment of the present disclosure. Encoding apparatus 100 shown in FIG. 4 may include multiplier 101, subtracter 102, de-emphasizer 103, DCT section 104, AVQ encoder (or split multi-rate lattice vector quantizer) 105 (which corresponds to, for example, quantization circuitry), floating bits manager 106, inverse DCT (iDCT) section 107, sub-vector identifier 108, code converter 109 (which corresponds to, for example, control circuitry), and multiplexer 110.

Multiplier 101 may, for example, multiply an adaptive codebook vector v(n) input from an adaptive codebook, by an adaptive codebook gain (or pitch gain) gp, and output the multiplied result to subtracter 102.

Subtracter 102 may, for example, subtract an adaptive codebook vector multiplied by the adaptive codebook gain and input from multiplier 101, from a linear prediction residual signal r(n) that is an encoding target in ACELP encoding, and determine (for example, calculate) an excitation residual signal $q_{in}(n)$. The excitation residual signal $q_{in}(n)$ may be, for example, calculated in accordance with the following Expression 2. Subtracter 102 may output the excitation residual signal $q_{in}(n)$ to de-emphasizer 103.

$$q_{in}(n) = r(n) - g_p \cdot v(n) \quad \text{(Expression 2)}$$

De-emphasizer 103 is, for example, a de-emphasis filter Fp(z), and may execute de-emphasis processing on the excitation residual signal $q_{in}(n)$ input from subtracter 102. De-emphasizer 103 may output an excitation residual signal $q_{in,d}(n)$ subjected to de-emphasis processing, to DCT section 104.

DCT section 104 may, for example, convert the excitation residual signal $q_{in,d}(n)$ input from de-emphasizer 103, to DCT coefficients, and output the DCT coefficients to AVQ encoder 105. A method of converting a signal in a time domain to a signal in a frequency domain is not limited to DCT processing and may be another method, such as discrete cosine transform (DFT) and modified discrete cosine transform (MDCT).

AVQ encoder 105 may perform split lattice vector quantization (or AVQ encoding) on the DCT coefficients of the excitation residual signal $q_{in,d}(n)$ input from DCT section 104.

For example, AVQ encoder 105 may split the DCT coefficients into a plurality of sub-vectors (SVs) and quantize the plurality of sub-vectors respectively to generate quantization parameters including codebook numbers (codebook indicators or codebook indices) and codevector indices that indicate any one of a plurality of codevectors included in the codebooks.

AVQ encoder 105 may, for example, in each sub-frame of encoding, determine the number of bits or bit budget allocated to AVQ (AVQ bit budget) in accordance with the sum of the number of bits fixed (or a predetermined number of bits or a fixed bit-budget) and the number of floating bits input from floating bits manager 106 (for example, the number of bits available additionally) (floating bit-budget), and output the number of bits or bit budget allocated to AVQ to code converter 109. AVQ encoder 105 may, for example, output information on the number of floating bits (floating bit-budget) updated in accordance with an excess number of bits after AVQ to floating bits manager 106.

AVQ encoder 105 may, for example, output a global gain code of the quantization parameters obtained through quantization to multiplexer 110. AVQ encoder 105 may, for example, output codebook indicators (codebook numbers) of the sub-vectors, codevector indices of the sub-vectors, and the number of bits allocated to AVQ (AVQ bit budget) to code converter 109. AVQ encoder 105 may, for example, output DCT coefficients of the quantized excitation residual signal $q_{in,d}(n)$ to inverse DCT section 107.

Floating bits manager 106 may hold (or manage) information on the number of bits available in an encoding frame in accordance with information on the number of floating bits input from AVQ encoder 105. For example, floating bits manager 106 may output the number of bits to be held as the number of floating bits to AVQ encoder 105 in AVQ encoding in a subsequent sub-frame.

Inverse DCT section 107 may output a quantized excitation residual signal $q_d(n)$ by performing inverse DCT conversion of the DCT coefficients of $q_{in,d}(n)$ input from AVQ encoder 105.

Sub-vector identifier 108 may, for example, identify a dominant sub-vector from among a plurality of sub-vectors in accordance with an input adaptive codebook vector v(n). Sub-vector identifier 108 may output information on the position of the dominant sub-vector (for example, dominant sub-vector information) to code converter 109. For example, here, since a target for quantization or encoding in AVQ encoder 105 is DCT coefficients, sub-vector identifier 108 may convert the adaptive codebook vector v(n) to DCT coefficients and identify the position (for frequency) of a sub-vector having the highest energy in a DCT coefficient domain (or a frequency domain) of the adaptive codebook vector v(n). When a target for quantization or encoding in AVQ encoder 105 is a signal in a time domain, sub-vector identifier 108 does not need to convert the adaptive codebook vector v(n) to DCT coefficients.

Sub-vector identifier 108 may be, for example, a memory that outputs information on the position of a predetermined specific sub-vector to code converter 109 regardless of the adaptive codebook vector v(n). In this case, since the position of the specific sub-vector is fixed, the position of the specific sub-vector may be written in a program when, for example, an embodiment of the present disclosure is implemented by the program of software. For example, sub-vector identifier 108 may set the third sub-vector or the last sub-vector of the plurality of (for example, eight) sub-vectors for the specific sub-vector. The specific sub-vector is not limited to the third sub-vector or the last sub-vector and may be a sub-vector in another position in order. For example, the position of the specific sub-vector may be set in a position in which there is a higher probability (frequency) that the codebook number further increases (for example, the highest position) and that is investigated experimentally or statistically.

Code converter 109 (codebook indications conversion) may, for example, convert encoding information of the codebook number of a specific sub-vector (for example, code conversion-targeted sub-vector) in accordance with codebook numbers and codevector indices of the plurality of sub-vectors, input from AVQ encoder 105, the number of bits allocated to AVQ of one sub-frame (AVQ bit-budget), and the dominant sub-vector information input from sub-vector identifier 108.

When, for example, the number of sub-vectors is eight, code converter 109 may output encoding information including codebook indicators (codebook indices) and codevector indices of the eight sub-vectors or output encoding information including codebook indicators of the seven sub-vectors, an indicator on the number of unused bits (referred to as, for example, an unused-bit indicator), and codevector indices of the eighth sub-vectors to multiplexer 110.

Multiplexer 110 may multiplex the global gain input from AVQ encoder 105 and the encoding information input from code converter 109 and output multiplexed bit stream information (for example, AVQ code).

Next, an example of the operations of encoding apparatus 100 will be described.

[Example of Selection of Code Conversion-Targeted Sub-Vector]

Code converter 109 may, for example, select a code conversion-targeted sub-vector (referred to as, for example, a targeted sub-vector) in accordance with the dominant sub-vector information (for example, information indicating the sub-vector identified as a dominant sub-vector) input from sub-vector identifier 108 and the number of bits allocated to AVQ in one sub-frame (the number of bits allocated for vector quantization) input from AVQ encoder 105.

Figure 5:
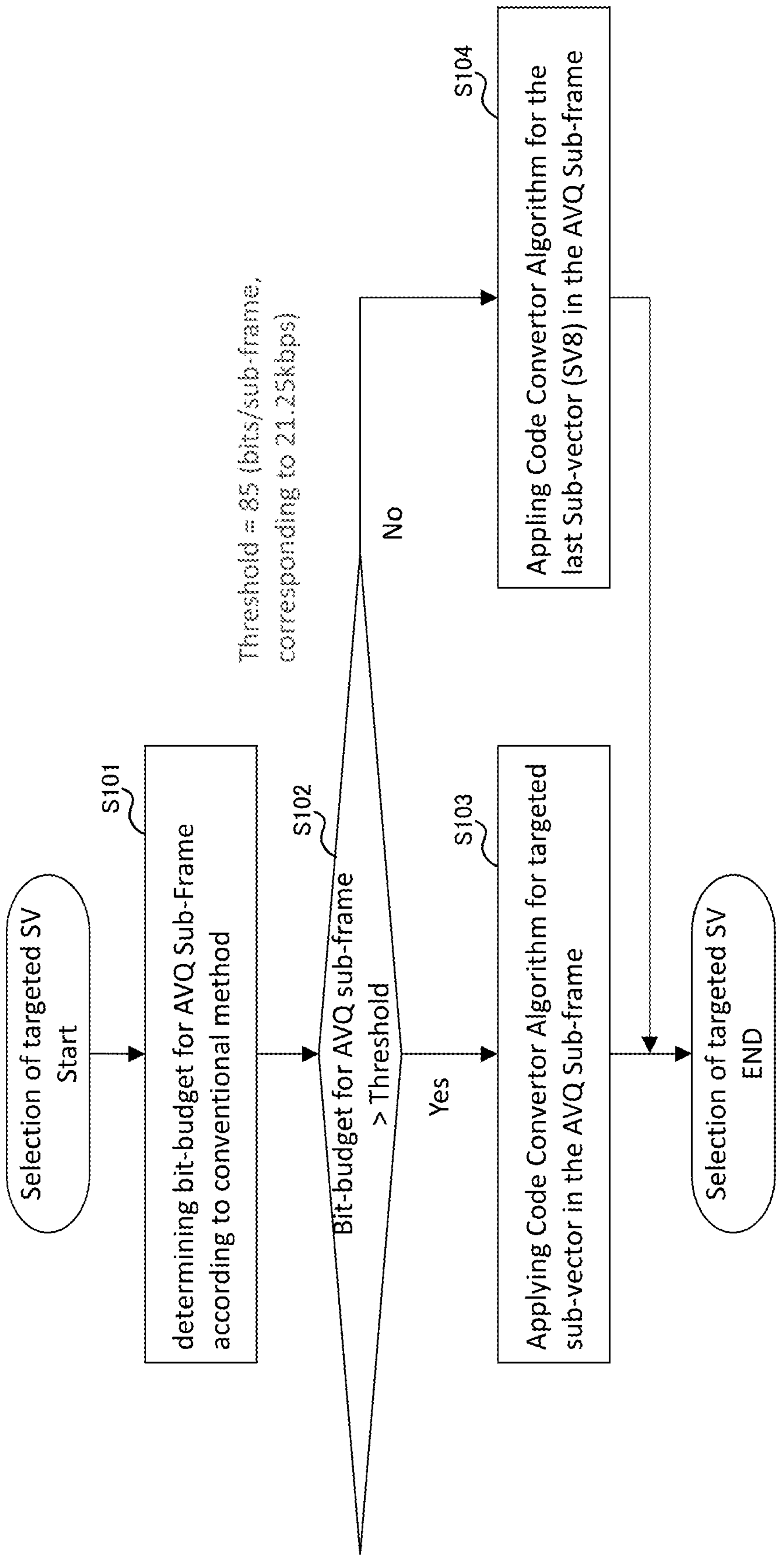
FIG. 5 is a flowchart showing an example of selection of a sub-vector.

FIG. 5 is a flowchart showing an example of selection of a code conversion-targeted sub-vector.

In FIG. 5, code converter 109, for example, determines the number of bits for AVQ (AVQ bit-budget) available in a sub-frame (for example, AVQ sub-frame) (S101).

Code converter 109, for example, determines whether the AVQ bit-budget exceeds a threshold Threshold (S102). For example, 85 [bit/subframe] may be set for the threshold or another value may be set for the threshold. The threshold may be, for example, set experimentally or statistically.

When the AVQ bit-budget exceeds the threshold (Yes in S102), code converter 109 may select a sub-vector identified by the dominant sub-vector information as a code conversion-targeted sub-vector from among the plurality of sub-vectors (S103).

On the other hand, when the AVQ bit-budget is less than or equal to the threshold (No in S102), code converter 109 may, for example, set the last sub-vector (for example, the eighth sub-vector SV8) for the code conversion-targeted sub-vector from among the plurality of sub-vectors (S104).

Code converter 109 may, for example, apply code conversion (described later) to the selected code conversion-targeted sub-vector.

An example of selection of a code conversion-targeted sub-vector has been described above.

Selection of a code conversion-targeted sub-vector may be performed not by code converter 109 but by sub-vector identifier 108. In this case, information on the AVQ bit-budget may be input to sub-vector identifier 108. For example, sub-vector identifier 108 may output dominant sub-vector information on the sub-vector selected for the code conversion-targeted sub-vector to code converter 109.

[Example of Code Conversion]

Next, an example of code conversion by code converter 109 will be described.

For example, code converter 109 may perform the processes of the following step 1 to step 3 in accordance with codebook indicators of the plurality of sub-vectors, input from AVQ encoder 105, and the selected code conversion-targeted sub-vector.

(Step 1)

Code converter 109, for example, sets the codebook indicators of the other sub-vectors at positions (for example, (N−1) sub-vectors) different from the code conversion-targeted sub-vector, of the plurality of (for example, N) codebook indicators for codes (or encoding codes). Code converter 109 may, for example, calculate the total sum of the number of bits used by the codebook indicators and the number of bits used by the codevector indices in the (N−1) sub-vectors.

(Step 2)

Code converter 109 may, for example, calculate the number of bits available for the codebook indicator of the code conversion-targeted sub-vector. For example, code converter 109 may calculate the number of bits available for encoding the codebook indicator of the code conversion-targeted sub-vector by subtracting the total sum of the number of bits used for encoding the (N−1) sub-vectors, calculated in (Step 1), from the total number of bits available for AVQ encoding (AVQ bit-budget).

(Step 3)

Code converter 109 may, for example, encode the number of bits not used for encoding (referred to as, for example, the number of unused bits) by calculating the number of unused bits, of the number of bits available for encoding the code conversion-targeted sub-vector, calculated in (Step 2). For example, code converter 109 may calculate the number of unused bits by subtracting the sum of the number of bits used by the codebook indicator and the number of bits used by the codevector index of the code conversion-targeted sub-vector from the number of bits available, calculated in (Step 2).

Code converter 109 may, for example, output the codebook indicator (encoding code) obtained through (Step 1) to (Step 3) and the information obtained by encoding the number of unused bits (for example, referred to as an unused-bit indicator or an unused-bit encoding code) to multiplexer 110.

Next, an example of the operations of code converter 109 will be described.

Figure 6:
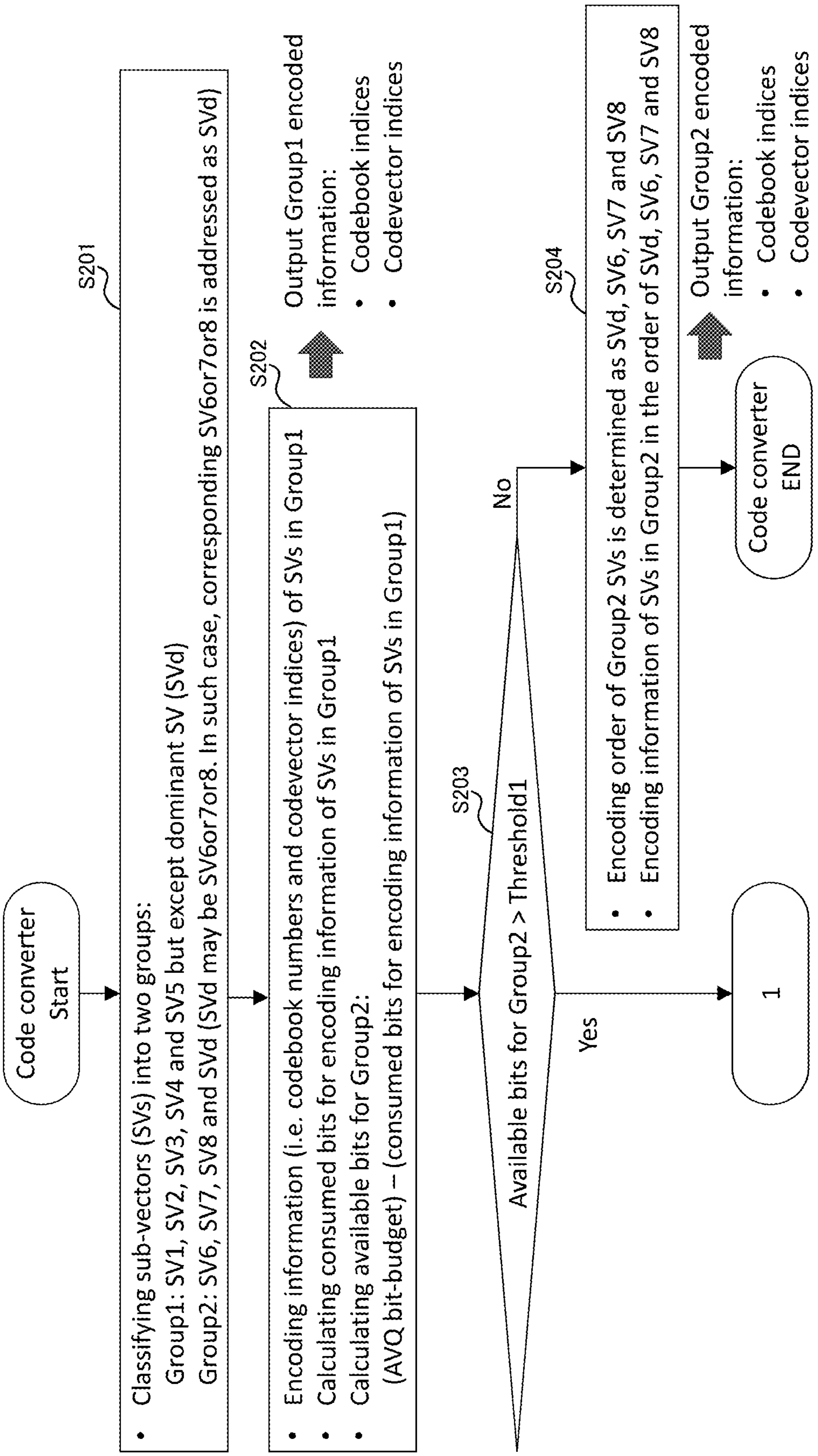
FIG. 6 is a flowchart showing an example of code conversion.
Figure 7:
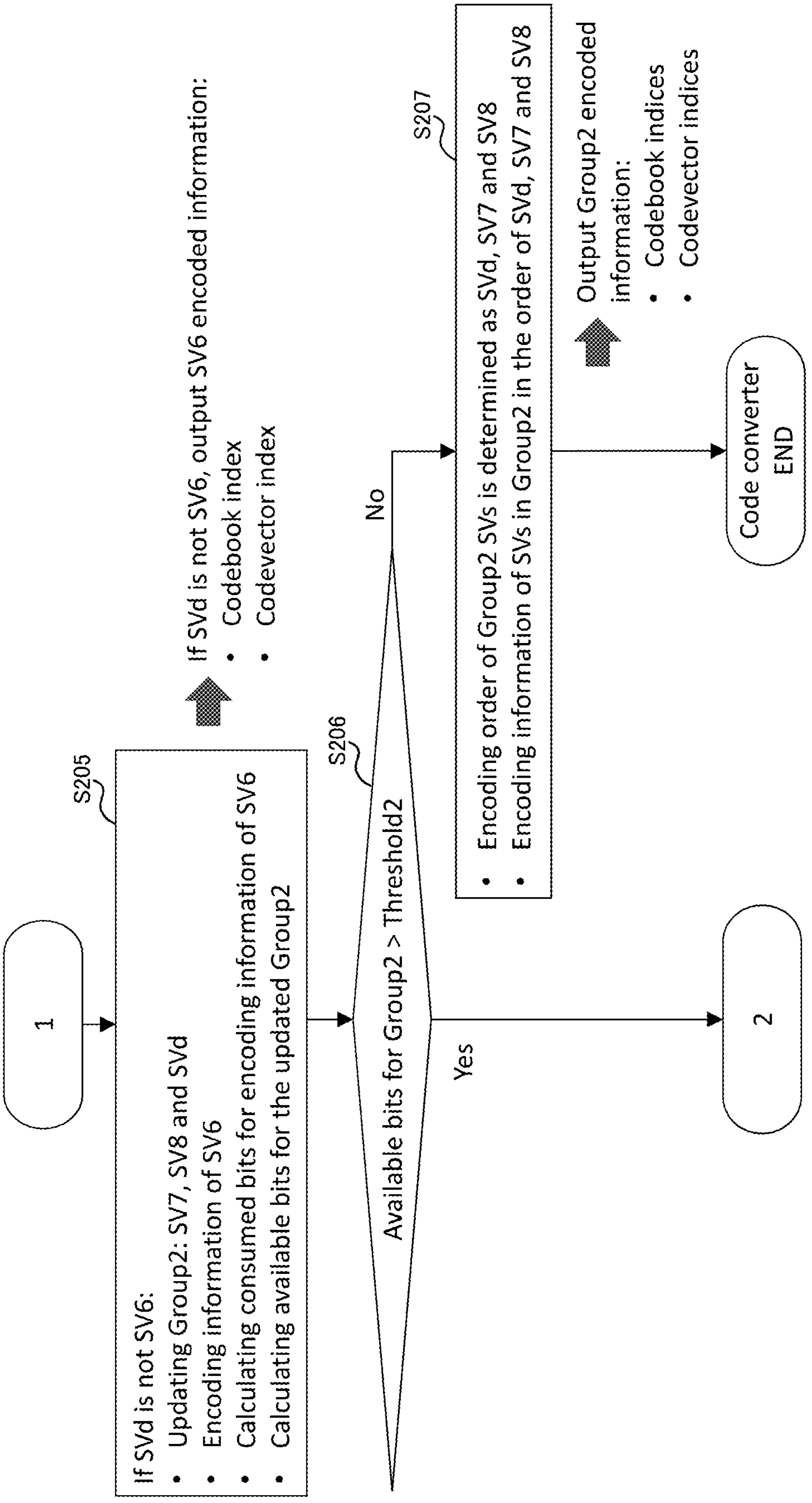
FIG. 7 is a flowchart showing an example of the code conversion.
Figure 8:
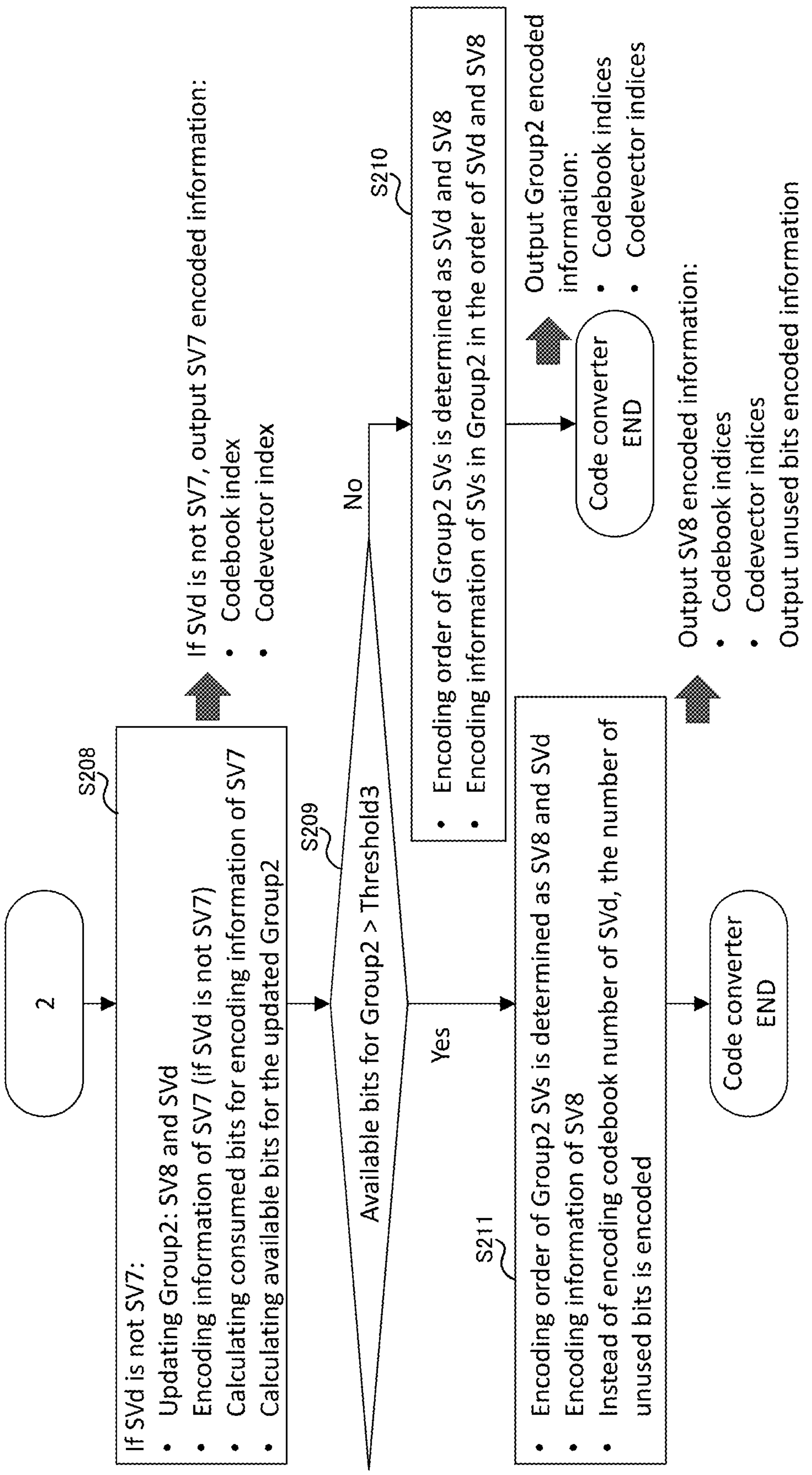
FIG. 8 is a flowchart showing an example of the code conversion.

FIGS. 6, 7, and 8 are flowcharts shown in an example of a process of code converter 109.

In FIG. 6, code converter 109 may, for example, classify a plurality of encoding-targeted sub-vectors into two groups (S201). When, for example, the number of encoding-targeted sub-vectors is eight (for example, SV1 to SV8), code converter 109 may divide the eight sub-vectors into the following two groups.

Group1: SV1 to SV5 but except a sub-vector (SVd) selected for a code conversion target Group2: SV6 to SV8, and SVd When, for example, the code conversion-targeted sub-vector SVd=SV3, Group1 may include SV1, SV2, SV4, and SV5, and Group2 may include SV6 to SV8, and SV3. When, for example, the code conversion-targeted sub-vector SVd=SV8, Group1 may include SV1 to SV5, and Group2 may include SV6 to SV8. SVd is not limited to SV3 or SV8.

Code converter 109 may, for example, encode sequentially the codebook indicators (codebook indices) and codevector indices of the sub-vectors classified as Group1 (S202). Code converter 109 may, for example, output the encoding information (the codebook indicators and the codevector indices) of the sub-vectors included in Group1 to multiplexer 110. Code converter 109 may, for example, calculate the number of bits used for encoding Group1 (for example, indicated by BITSgroup1) (S202). Code converter 109 may, for example, determine the number of bits available for encoding the sub-vectors classified as Group2 (for example, BITSgroup2) in accordance with the following Expression 3 (S202).

$$(BITSgroup2) = (AVQ\ \text{bit-budget}) - (BITSgroup1) \qquad \text{Expression 3}$$

Code converter 109 may, for example, determine whether BITSgroup2 exceeds a threshold Threshold1 (S203).

When BITSgroup2 exceeds the threshold Threshold1 (Yes in S203), code converter 109 may proceed to the process shown in FIG. 7 (for example, the process of S205).

On the other hand, when BITSgroup2 is less than or equal to the threshold Threshold1 (No in S203), code converter 109 may determine the order in which the sub-vectors in Group2 are encoded as follows, and encode the sub-vectors in the determined order (S204).

For cases where SVd is any one of SV1 to SV5: SVd, SV6, SV7, and SV8

For the other cases: SV6, SV7, and SV8

Code converter 109 outputs encoding information including the codebook indicators and the codevector indices of the sub-vectors of Group2 to multiplexer 110 and ends the code conversion.

In FIG. 7, when, for example, SVd is not SV6, code converter 109 may update Group2 while excluding SV6 from Group2, encode SV6, and encoding information including the codebook number and the codevector index of SV6 to multiplexer 110 (S205). Code converter 109 may, for example, calculate the number of bits used for encoding SV6 and update BITSgroup2 by subtracting the calculated number of bits from BITSgroup2. In other words, the updated BITSgroup2 may indicate the number of bits available for encoding SVs excluding SV6 from Group2.

When SVd is SV6, each of Group2 and BITSgroup2 does not need to be changed (or updated).

Subsequently, code converter 109 may, for example, determine whether BITSgroup2 exceeds a threshold Threshold2 (S206).

When BITSgroup2 exceeds the threshold Threshold2 (Yes in S206), code converter 109 may proceed to the process shown in FIG. 8 (for example, the process of S208).

On the other hand, when BITSgroup2 is less than or equal to the threshold Threshold2 (No in S206), code converter 109 may determine the order in which the sub-vectors in Group2 are encoded as follows, and encode the sub-vectors in the determined order (S207).

For cases where SVd is any one of SV1 to SV6: SVd, SV7, and SV8

For the other cases: SV7, and SV8

Code converter 109 outputs encoding information including the codebook indicators and the codevector indices of the sub-vectors of Group2 to multiplexer 110 and ends the code conversion.

In FIG. 8, when, for example, SVd is not SV7, code converter 109 may update Group2 while excluding SV7 from Group2, encode SV7, and output encoding information including the codebook number and the codevector index of SV7 to multiplexer 110 (S208). Code converter 109 may, for example, calculate the number of bits used for encoding SV7 and update BITSgroup2 by subtracting the calculated number of bits from BITSgroup2. In other words, the updated BITSgroup2 may indicate the number of bits available for encoding SVs excluding SV7 from Group2.

When SVd is SV7, each of Group2 and BITSgroup2 does not need to be changed (or updated).

Subsequently, code converter 109 may, for example, determine whether BITSgroup2 exceeds a threshold Threshold3 (S209).

When BITSgroup2 is less than or equal to the threshold Threshold3 (No in S209), code converter 109 may determine the order in which the sub-vectors in Group2 are encoded as follows, and encode the sub-vectors in the determined order (S210).

For cases where SVd is any one of SV1 to SV7: SVd, and SV8

For the other cases: SV8

Code converter 109 outputs encoding information including the codebook indicators and the codevector indices of the sub-vectors of Group2 to multiplexer 110 and ends the code conversion.

On the other hand, when BITSgroup2 is less than or equal to the threshold Threshold3 (Yes in S209), code converter 109 may determine the order in which the sub-vectors in Group2 are encoded as follows, and encode the sub-vectors in the determined order (S211).

For cases where SVd is any one of SV1 to SV7: SV8, and SVd

For the other cases: SV8

Code converter 109 outputs encoding information including the codebook indicator and the codevector index of SV8 and the indicator of the number of unused bits to multiplexer 110 and ends the code conversion. In other words, code converter 109 may output encoding information of the number of unused bits to multiplexer 110 instead of encoding information of the codebook indicator of SVd.

When SVd is SV8, code converter 109 may, for example, output any one of the codebook indicator and the indicator of the number of unused bits and the codevector index, of SV8 to multiplexer 110. Any one of the codebook indicator and the number of unused bits may be determined in advance.

In this way, code converter 109 may determine which one of encoding of the codebook number of SVd and encoding of the number of unused bits is to be executed, in accordance with the number of bits available for encoding Group2. For example, code converter 109 may determine to encode the codebook number (in other words, output the codebook indicator) when the number of bits available for encoding Group2 is less than or equal to the threshold (for example, Threshold1, Threshold2, or Threshold3) and determine to encode the number of unused bits (in other words, output the unused-bit indicator) when the number of bits available for encoding Group2 exceeds the threshold.

Here, in FIGS. 6, 7, and 8, the thresholds Threshold1, Threshold2, and Threshold3 may be set as follows.

For example, an average number of bits allocated per sub-vector in accordance with the number of bits fixedly allocated to AVQ is indicated by $BITS_{SV}$.

In the above-described example, for example, Threshold1 may be set to 4×$BITS_{SV}$ when SVd is any one of SV1 to SV5 and may be set to 3×$BITS_{SV}$ when SVd is any one of SV6 to SV8.

For example, Threshold2 may be set to 3×$BITS_{SV}$ when SVd is any one of SV1 to SV6 and may be set to 2×$BITS_{SV}$ when SVd is any one of SV7 to SV8.

For example, Threshold3 may be set to 2×$BITS_{SV}$ when SVd is any one of SV1 to SV7 and may be set to $BITS_{SV}$ when SVd is SV8.

In this way, the number of bits obtained by multiplying the number of SVs classified as Group2, by $BITS_{SV}$ may be set for a threshold.

[Example of Encoding of Number of Unused Bits]

Next, an example of encoding of the number of unused bits by code converter 109 (for example the process of S211 in FIG. 8) will be described.

Figure 9:
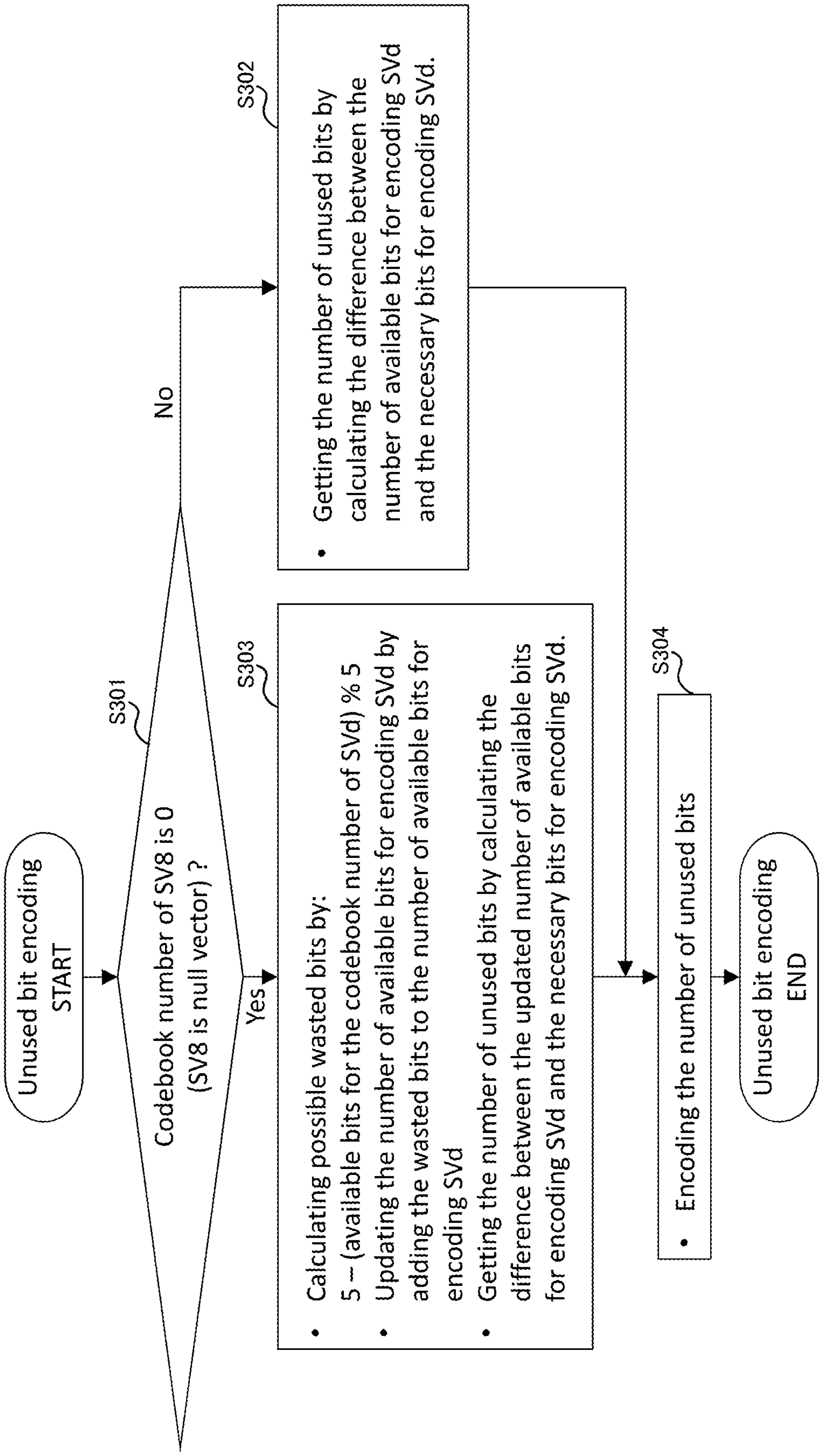
FIG. 9 is a flowchart showing an example of encoding of the number of unused bits.

FIG. 9 is a flowchart showing an example of encoding of the number of unused bits by code converter 109.

In FIG. 9, code converter 109, for example, determines whether the encoded result (for example, codebook number) of SV8 is zero (S301). In other words, code converter 109 may determine whether SV8 is a null vector (or a zero vector). The process of S301 is, for example, a process of determining whether encoding of code 0 of SV8 is abandoned (aborted) (for example, SV8 is encoded with zero bits) because, in AVQ encoding used in EVS standards, the encoded result of SV8 is zero and the number of bits available for AVQ consumed for encoding the sub-vector.

When SV8 is not zero (No in S301), code converter 109 may set the number of bits obtained by subtracting the number of bits used to encode the codebook number of SVd from the number of bits available for encoding the codebook number of SVd for the number of unused bits (S302).

Even when SV8 is not zero, there is a case where the last digit (for example, stop bit 0) of the codebook indicator of the encoded result of SV8 in AVQ encoding is abandoned. In this case, the number of bits used to encode SVd reduces by one bit. Insufficiency of one bit may be covered by abandoning stop bit 0 in encoding SVd or insufficiency of one bit may be covered by the number of bits saved by applying an embodiment of the present disclosure.

When, for example, the encoded result of SV8 is zero and stop bit 0 is abandoned, there is a possibility that SV7 or SV6 is also abandoned (for example, SV7 or SV6 may be encoded by zero bits). In this way, when two or more SVs are abandoned, one bit (for example, codebook indicator 0) is allocated to each of the two or more SVs, so the number of bits available for encoding SVd can reduce by two or more bits. Such a case can be, for example, detected in accordance with whether the number of bits available for encoding SVd is an odd number of bits as the number of bits used to encode SV (for example, whether the number of bits available is different from multiples of five).

As described above, in encoding the number of unused bits, the order of encoding SVd is set (in other words, replaced) to the last position in the order of sub-vectors included in Group2. Here, in FIG. 9, when SV8 is zero (Yes in S301), there is a possibility that, for example, an SV to be encoded with zero bits (for example, an SV of which the number of bits allocated is zero and that is not encoded) of SVs encoded before SVd. For example, as in the case of the process of S211 in FIG. 8, when encoding of the number of unused bits is performed instead of encoding SVd, another SV can be encoded before SVd. When the SV encoded before SVd is an SV encoded with zero bits, one bit (for example, codebook indicator 0 shown in FIG. 1) for encoding zero is consumed (or wasted) for one SV, so the number of bits available for encoding SVd (or the number of unused bits) can reduce (or can be insufficient). Hereinafter, a bit that is wasted for an SV encoded with zero bits is referred to as a wasted bit.

When SV8 (or an SV before SV8) is encoded with zero bits, all the bits allocated to AVQ encoding are used, so the number of unused bits is zero.

For this reason, when there is a difference between the number of bits available for encoding SVd (for example, a remaining number of bits) and the number of bits used to encode SVd, this difference can correspond to the number of SVs encoded with zero bits. For example, as shown in FIG. 1, when the codebook number is greater than or equal to two, the number of bits used to encode SVd is a multiple of five.

For example, code converter 109 may update the number of bits available for encoding SVd to a multiple of five by adding a waste number of bits to the number of bits available for encoding SVd (for example, a remaining number of bits) (S303). Code converter 109 may, for example, determine that the number of unused bits is zero.

In this way, code converter 109 may, for example, calculate the number of unused bits in accordance with the number of bits available for encoding an original SVd (in other words, when the order of encoding SVd is not changed) when there occur wasted bits by calculating the number of bits of the wasted bits and adding the wasted bits to the number of bits available for encoding SVd. In other words, code converter 109 may update the number of bits available for encoding SVd in accordance with the number of consecutive sub-vectors of which the quantization parameters are null vectors, of the sub-vectors different from SVd in Group2.

Subsequently, code converter 109 may encode the number of unused bits (for example, convert the number of unused bits to an indicator) obtained through the process of S302 or the process of S303 (S304). FIG. 10 is a table showing an example of encoding of the number of unused bits. In FIG. 10, the number of unused bits, different from zero bits, has a width, and the number of bits used for encoding is defined to a multiple of five (or one), so the unique number of bits can be derived in accordance with the number of bits available during decoding.

In an example, when the number of bits available is 13 bits and the code (indicator) of unused bits is “10”, the number of unused bits can be identified as three bits in order for the number of bits except unused bits to be a multiple of five if there is no wasted bit.

It is possible to determine whether there is a wasted bit by using, for example, whether SV8 to be decoded is a zero vector, a remainder obtained by dividing the number of bits available by five (for example, a remainder divided by five or modulo five) (hereinafter, also referred to as, for example, a remaining number of bits) and the number of consecutive decoded SVs that become zero vectors, including SV8. For example, when SV8 is not a zero vector, no wasted bit occurs. For example, a case where there occur wasted bits is a case where the number of unused bits is zero. The number of wasted bits can be identified by, for example, the number of consecutive decoded SVs that become zero vectors, including SV8, and a remainder of the number of bits available, divided by five (for example, a remaining number of bits).

The number of unused bits in a case where there occur wasted bits may be, for example, determined as follows.

In an example, when the number of bits available for encoding SVd is 12 bits and decoded values of three consecutive SVs, including SV8, are zero vectors (null vectors), three bits (for example, 5−(12 modulo 5)=3) used to encode three zero vectors (for example, SV6 to SV8) at the time of changing the order of encoding SVd are wasted bits. Thus, 15 bits obtained by adding three bits to 12 bits are the number of bits available for encoding SVd. Thus, the number of bits available for encoding SVd is equal to the number of bits used to encode SVd (for example, a multiple of five), and the number of unused bits is zero.

In another example, a case where the number of bits available for encoding SVd is 13 bits, decoded values of three consecutive SVs (for example, SV6 to SV8), including SV8, are zero vectors (null vectors), SV6 is encoded with one bit, and SV7 and SV8 are encoded with zero bits (for example, unencoded zero vectors) will be described. In this case, of three bits used to encode three zero vectors (encode SV6 to SV8) at the time of changing the order of encoding SVd, at least two bits (for example, 5−(13 modulo 5)=2) are wasted bits. Thus, 15 bits obtained by adding two bits to 13 bits are the number of bits available for encoding SVd. Thus, the number of bits available for encoding SVd is equal to the number of bits used to encode SVd (for example, a multiple of five), and the number of unused bits is zero.

When, for example, the number of unused bits is zero, the number of bits used for encoding is one as shown in FIG. 10. When, for example, the number of bits used to encode SVd is 15, the codebook number=3 and the number of bits used to encode the codebook indicator is three as shown in FIG. 1. In the above-described example, the number of bits used to encode the number of unused bits is one, wasted bits are two bits, and the number of bits is three in total. Thus, in a case where there occur wasted bits, the number of bits used for encoding is equal between when the codebook indicator of SVd is encoded (for example, three bits) and the number of unused bits is encoded (for example, one bit+two wasted bits).

In this way, even when there occur wasted bits, encoding apparatus 100 can encode the number of unused bits by suppressing an increase in the number of bits used for encoding.

Since the number of unused bits in a case where it is determined that there occur wasted bits is zero, code converter 109 may, for example, change (or update) the number of bits available for encoding SVd and finally determine the number of unused bits to zero without calculating a difference from the number of bits used to encode SVd. When, for example, the codebook number of SVd is decoded by dividing the number of bits available for encoding SVd by five, the number of bits available for encoding SVd may be changed as described above. Alternatively, the decoding procedure in which the codebook number is decoded by adding one to the codebook number obtained by dividing the number of bits available for encoding SVd, by five may be changed.

An example in which the code of the number of unused bits shown in FIG. 10 is allocated in ascending order of the number of unused bits is described; however, the configuration is not limited thereto. For example, the code may be allocated in descending order of appearance frequency of the number of unused bits. For example, as the number of unused bits has a higher appearance frequency, the code with a smaller number of bits may be allocated. Thus, it is possible to reduce the number of bits used to encode the number of unused bits.

[Example of Configuration of Decoding Apparatus]

Figure 11:
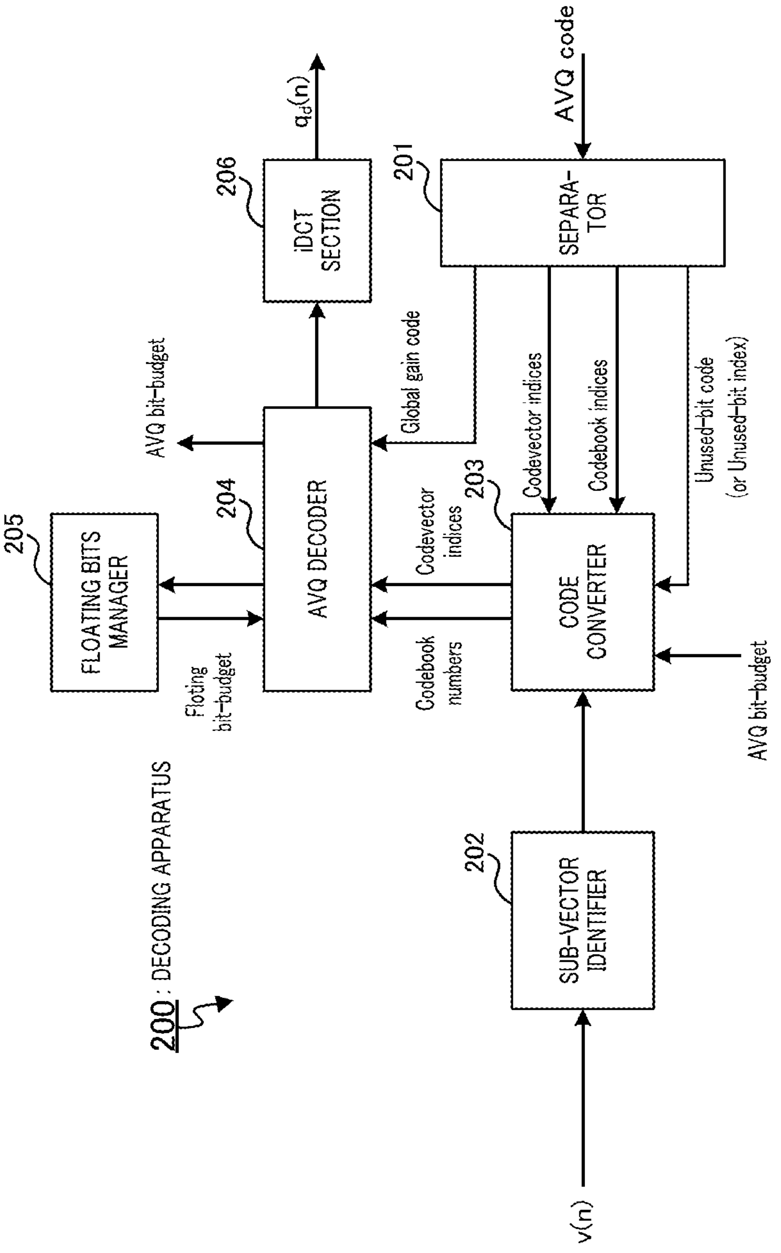
FIG. 11 is a block diagram showing an example of the configuration of a decoding apparatus according to Embodiment 1.

FIG. 11 is a block diagram showing an example of signal processing related to AVQ decoder (hereinafter, referred to as a decoding apparatus for the sake of convenience) 200 according to an embodiment of the present disclosure. Decoding apparatus 200 shown in FIG. 11 may include, for example, separator 201, sub-vector identifier 202, code converter 203 (which corresponds to, for example, control circuitry), AVQ decoder 204 (which corresponds to, for example, inverse quantization circuitry), floating bits manager 205, and inverse DCT section 206.

In decoding apparatus 200, a bit stream sent from encoding apparatus 100 is input to separator 201.

Separator 201 may, for example, separate a global gain code, codevector indices, codebook indicators (codebook indices), and an unused-bit indicator (an unused-bit code or an unused-bit index) from an AVQ code included in the input bit stream. Separator 201 may, for example, output the global gain code to AVQ decoder 204, and output the codebook indicators, the codevector indices, and the unused-bit indicator to code converter 203.

Sub-vector identifier 202 may, for example, identify a dominant sub-vector from among a plurality of sub-vectors in accordance with an input adaptive codebook vector v(n). Sub-vector identifier 202 may, for example, output information on the position of the dominant sub-vector (for example, dominant sub-vector information) to code converter 203. For example, here, since a target for quantization or encoding in encoding apparatus 100 (for example, AVQ encoder 105) are DCT coefficients, sub-vector identifier 202 may convert the adaptive codebook vector v(n) to DCT coefficients and identify the position (for frequency) of a sub-vector having the highest energy in a DCT coefficient domain of the adaptive codebook vector v(n). When a target for quantization or encoding in encoding apparatus 100 is a signal in a time domain, sub-vector identifier 202 does not need to convert the adaptive codebook vector v(n) to DCT coefficients.

Code converter 203 may, for example, calculate the codebook indicator of the sub-vector at a specific position (for example, code conversion-targeted sub-vector) in accordance with information input from separator 201 and information input from sub-vector identifier 202. For example, code converter 203 may calculate the codebook indicator of the code conversion-targeted sub-vector in accordance with the codebook indicators, the codevector indices, and the unused-bit indicator, input from separator 201, and the number of bits available for AVQ (for example, AVQ bit-budget) input from AVQ decoder 204. Code converter 203 may output the codebook indicator and the codevector index of each sub-vector to AVQ decoder 204.

For example, code converter 203 may execute the processes of the following step 4 to step 7.

(Step 4)

Code converter 203, for example, decodes the codebook indicators of the other sub-vectors different from the code conversion-targeted sub-vector in accordance with the codebook indicators. Code converter 203 may, for example, calculate the number of bits used to encode sub-vectors different from the code conversion-targeted sub-vector (for example, the sum of the number of bits used by the codebook indicators and the number of bits used by the codevectors) in accordance with the decoded codebook indicators.

(Step 5)

Code converter 203 may, for example, decode the number of unused bits in accordance with the unused-bit indicator.

(Step 6)

Code converter 203 may, for example, calculate the number of bits for encoding the code conversion-targeted sub-vector in accordance with the number of bits for encoding the sub-vectors, calculated in (Step 4), and the number of unused bits, decoded in (Step 5).

(Step 7)

Code converter 203 may, for example, calculate (or decode) the codebook indicator of the code conversion-targeted sub-vector in accordance with the number of bits for encoding the sub-vector calculated in (Step 6).

AVQ decoder 204 may, for example, decode (or inversely quantize) quantized DCT coefficients in accordance with the global gain code input from the separator, the codebook indicators and the codevector indices of the SVs, input from code converter 203, and the number of floating bits, input from floating bits manager 205, and output the decoded (or inversely quantized) quantized DCT coefficients to inverse DCT section 206. AVQ decoder 204 may, for example, determine (for example, calculate) the number of bits allocated to AVQ in accordance with the sum of the fixed number of bits (or the predetermined number of bits) and the number of floating bits, input from floating bits manager 205, and output the determined (or calculated) number of bits to code converter 203. AVQ decoder 204 may, for example, output information on the number of floating bits updated in accordance with an excess number of bits after AVQ decoding to floating bits manager 205.

Floating bits manager 205 may hold (or manage) information on the number of bits available in a decoding frame in accordance with information on the number of floating bits input from AVQ decoder 204. For example, floating bits manager 205 may output the number of bits to be held as the number of floating bits to AVQ decoder 204 in AVQ decoding in a subsequent sub-frame.

Inverse DCT section 206 may, for example, convert decoded quantized DCT coefficients input from AVQ decoder 204 to a signal in a time domain by means of inverse DCT transform, and output the signal in a time domain as a decoding excitation residual signal qd(n).

As described above, in the present embodiment, encoding apparatus 100 determines which one of encoding of the codebook number of the code conversion-targeted sub-vector and encoding which is based on a difference between the number of bits allocated to vector quantization and the number of bits of quantization parameters (for example, encoding of the number of unused bits) is to be executed, in accordance with the number of bits available for encoding sub-vectors in vector quantization.

In this way, by switching between encoding of the codebook number and encoding of the number of unused bits in accordance with the number of bits available for encoding, it is possible to perform encoding according to the number of bits available for encoding in multi-rate lattice vector quantization, so it is possible to reduce the number of bits for encoding. Thus, according to the present embodiment, it is possible to reduce the number of bits for encoding in multi-rate lattice vector quantization.

According to the present embodiment, even when the code conversion-targeted sub-vector for an unused-bit indicator is a sub-vector different from the last sub-vector (for example, SV8) (in other words, when the order of encoding is changed), encoding apparatus 100 can accurately determine the number of unused bits according to the number of wasted bits that can occur as a result of a change of the order of encoding. When, for example, there occur wasted bits, encoding apparatus 100 can accurately estimate the number of unused bits according to the number of wasted bits. Therefore, it is possible to suppress an error due to an insufficient number of bits for encoding or reduction in codebook number (for example, reduction in the accuracy of codebook) and to suppress a decrease in encoding performance.

For example, even in a case of bit allocation with which no wasted bit occurs even when the order of encoding of SVs is changed (for example, in a case of bit allocation with which there is no SV that is encoded with zero bits), but when wasted bits can occur (for example, when an SV that is encoded with zero bits can be present), encoding apparatus 100 may rearrange the allocation of encoding bits such that wasted bits occur. In an example, a case where, in Group2 including SVd, SV6, SV7, and SV8, SV6, SV7, and SV8 are encoded with zero (one bit), SVd is encoded with 10 bits (codebook number 2), and the number of bits available in encoding SVd is 13 bits will be described. In this case, since SV6 to SV8 are zero vectors, encoding apparatus 100 may set bit allocation for SV6 to SV8 to zero bits and allocate three bits allocated to SV6 to SV8 may be allocated (in other words, may be transferred) to bits for encoding SVd. When there occur wasted bits (for example, allocation of zero bits is possible), the number of unused bits is zero, and the total of the remaining number of bits and the number of consecutive zero vectors is limited to a multiple of five, so sub-vectors to which allocation of zero bits is allowed are SV7 and SV8. Therefore, the number of bits that can be transferred to bits for encoding SVd is two. In this case, encoding apparatus 100, for example, sets the number of bits available for SVd to 15 obtained by adding two bits to 13 bits and encodes SVd with codebook number 3 (for example, 15 bits). In this case, the number of unused bits is zero. In this way, by rearranging bit allocation, it is possible to reliably determine the presence or absence of wasted bits at a decoding side and to improve the accuracy of encoding SVd.

According to the present embodiment, decoding apparatus 200, for example, can identify encoding information on the code conversion-targeted sub-vector in accordance with parameters such as the number of bits used to encode and decoded information (for example, codebook indicators of sub-vectors other than the code conversion-targeted sub-vector). Thus, for example, a signal for switching between encoding of codebook indicators and encoding of the number of unused bits (for example, a flag or switching-specific control information) does not need to be provided from encoding apparatus 100 to decoding apparatus 200.

Embodiment 2

Figure 12:
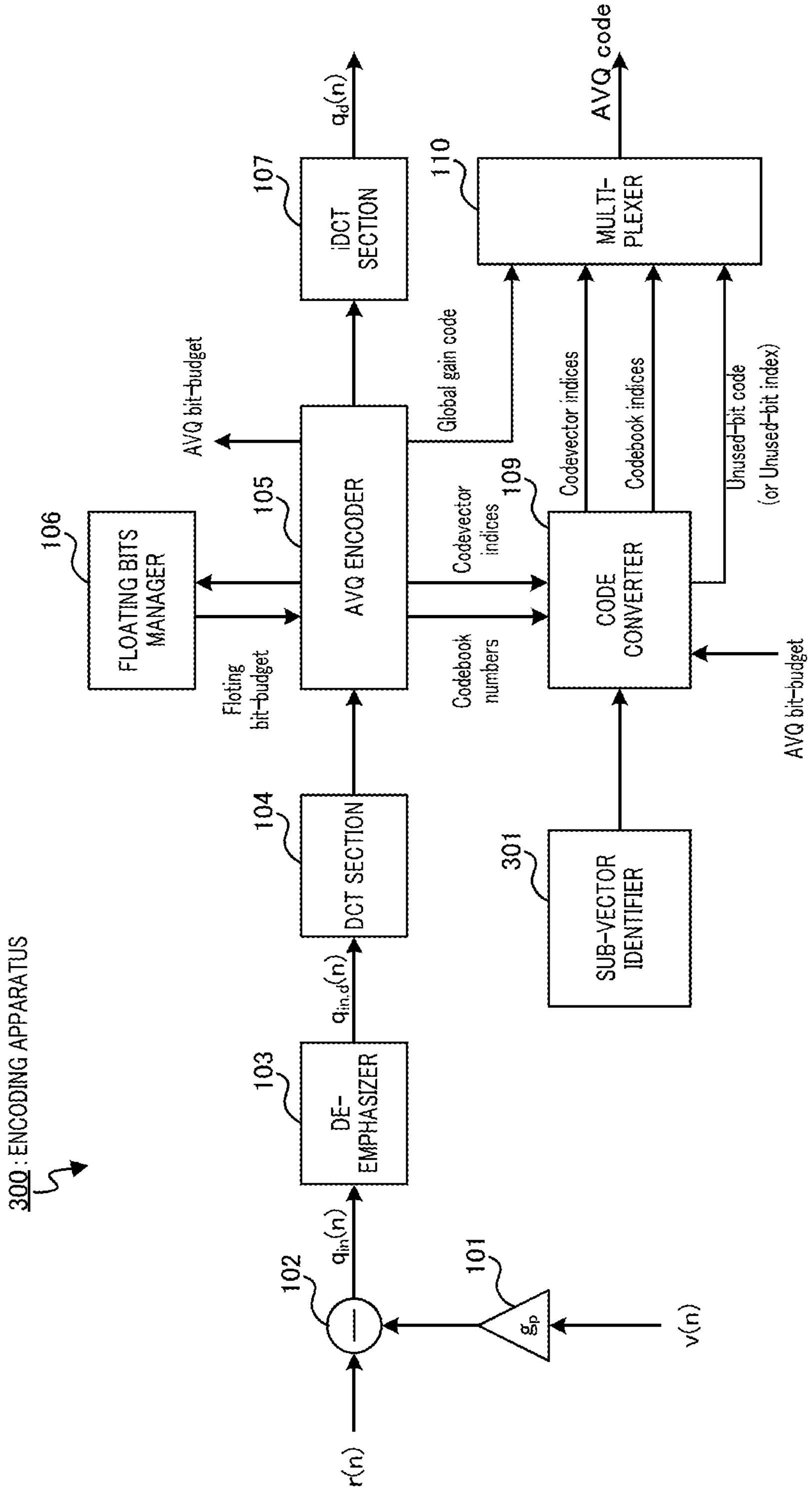
FIG. 12 is a block diagram showing an example of the configuration of an encoding apparatus according to Embodiment 2.

FIG. 12 is a block diagram showing an example of the configuration of AVQ encoder (hereinafter, referred to as an encoding apparatus for the sake of convenience) 300 according to an embodiment of the present disclosure. In FIG. 12, like reference signs are assigned to components that perform similar processes to those of encoding apparatus 100 shown in FIG. 4.

In FIG. 12, sub-vector identifier 301 may output information on the position of a predetermined sub-vector (referred to as, for example, a target sub-vector or a fixed sub-vector) to code converter 109. The predetermined sub-vector may be, for example, any one of eight sub-vectors (for example, SV1 to SV8). For example, hereinafter, a case where, of the eight sub-vectors SV1 to SV8, the predetermined sub-vector is the third sub-vector (for example, SV3) or the last sub-vector (for example, SV8) in ascending order in a frequency domain will be described.

Sub-vector identifier 301 does not need to execute any signal processing or may, for example, does not explicitly include any constituent element for identifying (designating) a sub-vector at a predetermined specific position. In FIG. 12, in an example, sub-vector identifier 301 may be a memory that holds the position of the predetermined sub-vector.

In encoding apparatus 300 shown in FIG. 12, the operations of the components different from sub-vector identifier 301 may be similar to the operations of encoding apparatus 100 shown in FIG. 4.

Next, an example of the operations of encoding apparatus 300, different from Embodiment 1, will be described.

A method of selecting a code conversion-targeted sub-vector may be similar to the method shown in FIG. 5. In the present embodiment, code converter 109 may use position information of the predetermined sub-vector instead of dominant sub-vector information. Selection of a sub-vector may be, for example, performed not by code converter 109 but by sub-vector identifier 301. In this case, AVQ bit-budget information may be input to sub-vector identifier 301, and information on a sub-vector to be selected may be input to code converter 109 as the position information of the sub-vector.

FIGS. 13 to 16 are flowcharts showing an example of the operations of encoding apparatus 300. FIGS. 13 to 16 show an example of the operations of encoding apparatus 300 in an example in a case where the position of the code conversion-targeted sub-vector is the third sub-vector SV3 in ascending order in a frequency domain.

Figure 13:
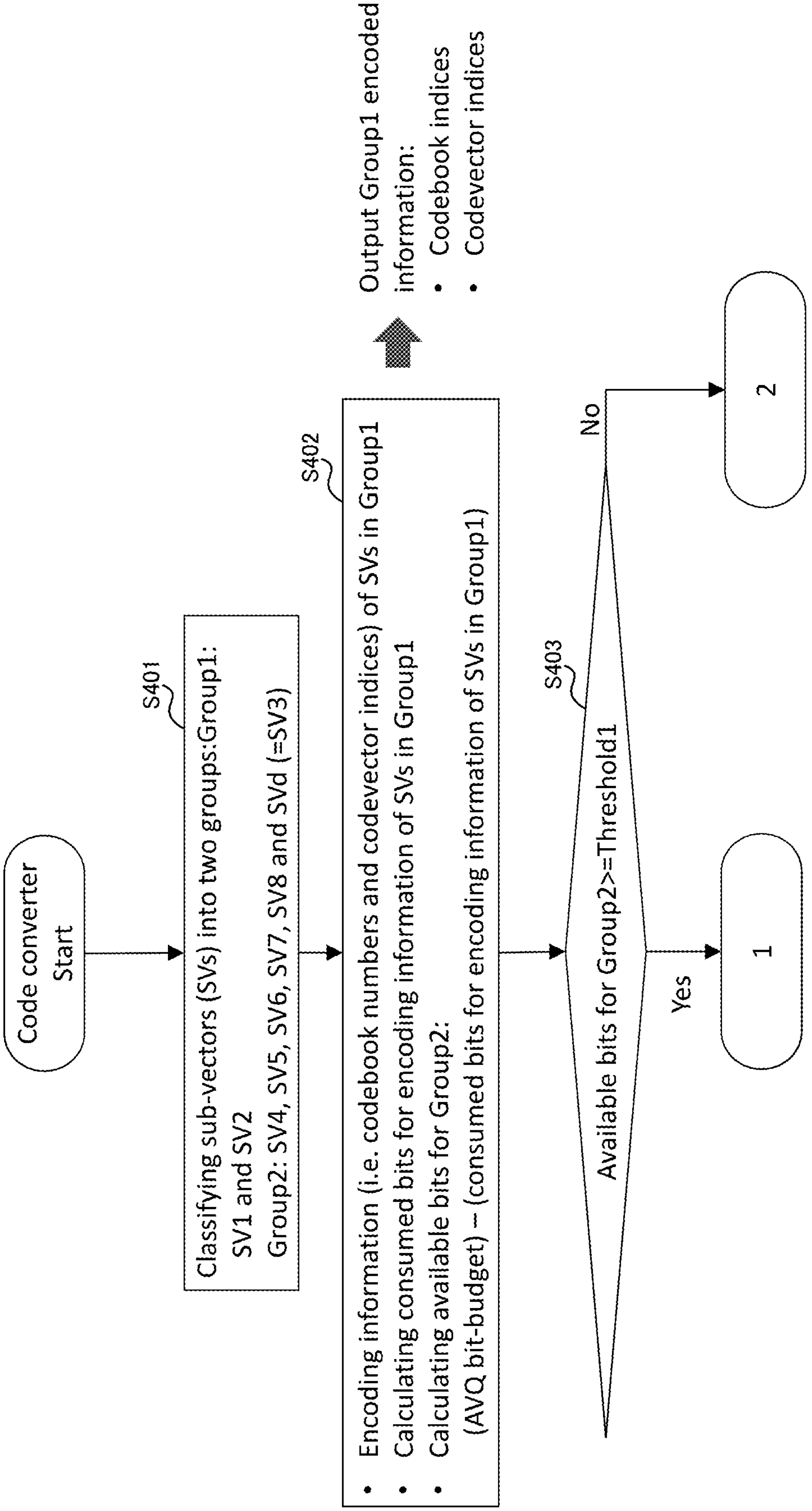
FIG. 13 is a flowchart showing an example of code conversion.

In FIG. 13, encoding apparatus 300, for example, classifies the sub-vectors SV1 to SV8 into Group1 including SV1 and SV2 and Group2 including five sub-vectors SV3 to SV8 (S401). For example, encoding apparatus 300 may, for example, classify the sub-vectors SV1 to SV8 into Group1 including sub-vectors before the code conversion-targeted sub-vector and Group2 including sub-vectors at and behind the code conversion-targeted sub-vector. For example, when encoding sub-vectors in the frequency domain, encoding apparatus 300 may classify a plurality of sub-vectors (for example, SV1 to SV8) into Group1 composed of sub-vectors having frequencies lower than the frequency of the conversion-targeted sub-vector and Group2 composed of sub-vectors having frequencies higher than the frequency of the conversion-targeted sub-vector. In other words, encoding apparatus 300 may classify the sub-vectors SV1 to SV8 into Group1 not including the code conversion-targeted sub-vector and Group2 including the code conversion-targeted sub-vector, setting the code conversion-targeted sub-vector as a boundary.

Subsequently, encoding apparatus 300, for example, encodes quantization parameters of the sub-vectors included in Group1 (for example, SV1 and SV2) and outputs encoding information (for example, the codebook indicators and the codevector indices) (S402). Encoding apparatus 300 may, for example, determine the number of bits used (or consumed) to encode Group1 and determine the number of bits available for encoding the sub-vectors of Group2 (for example, SV3 to SV8).

Subsequently, encoding apparatus 300, for example, determines whether the number of bits available for encoding the sub-vectors of Group2 is greater than or equal to the threshold Threhold1 (S403). For example, encoding apparatus 300 proceeds to a process shown in FIG. 14 (for example, the process of S404) when the number of bits available for encoding the sub-vectors of Group2 is less than Threshold1 (No in S403), and proceeds to a process shown in FIG. 15 (for example, the process of S408) when the number of bits available for encoding the sub-vectors of Group2 is greater than or equal to Threshold1 (Yes in S403).

Here, when the sub-vector selected as a code conversion target is the third sub-vector (for example, SV3), Threshold1 may be set to 30 bits. When, for example, of the sub-vectors SV1 to SV8, SV3 is set to the sub-vector to be encoded at the end (in other words, when the order of encoding is changed), one bit can be used to encode each of the sub-vectors SV4 to SV8 behind SV3 (for example, up to five bits for the five sub-vectors) can be used to encode each sub-vector when a decoded result of each of the sub-vectors SV4 to SV8 is zero (for example, a null vector). On the other hand, in a case of AVQ encoding (in other words, when the order of encoding is not changed), there is a possibility that SV4 to SV8 behind SV3 each are encoded with zero bits. If SV4 to SV8 are encoded with zero bits through AVQ encoding, five bits in total are used to encode SV4 to SV8 in an encoding method that performs code conversion according to the present embodiment, so the effect of reducing bits greater than or equal to five bits is expected in encoding SV3. For example, referring to FIGS. 1 and 10, the number of bits for encoding in a case where the number of unused bits is zero is one bit, so the codebook number of SV3 may be greater than or equal to six to obtain the effect of reducing five bits. For example, when the codebook number is six, encoding information including the codevector index has 30 bits. Thus, 30 bits may be set for the threshold Threshold1.

When the position of the specific sub-vector is different from that of SV3, the sub-bands included in Group2 and the threshold Threshold1 may be set according to the specific sub-vector. When, for example, SV4 is set for the specific sub-vector, SV4 to SV8 may be included in Group2, and 25 bits may be set for Threshold1.

Figure 14:
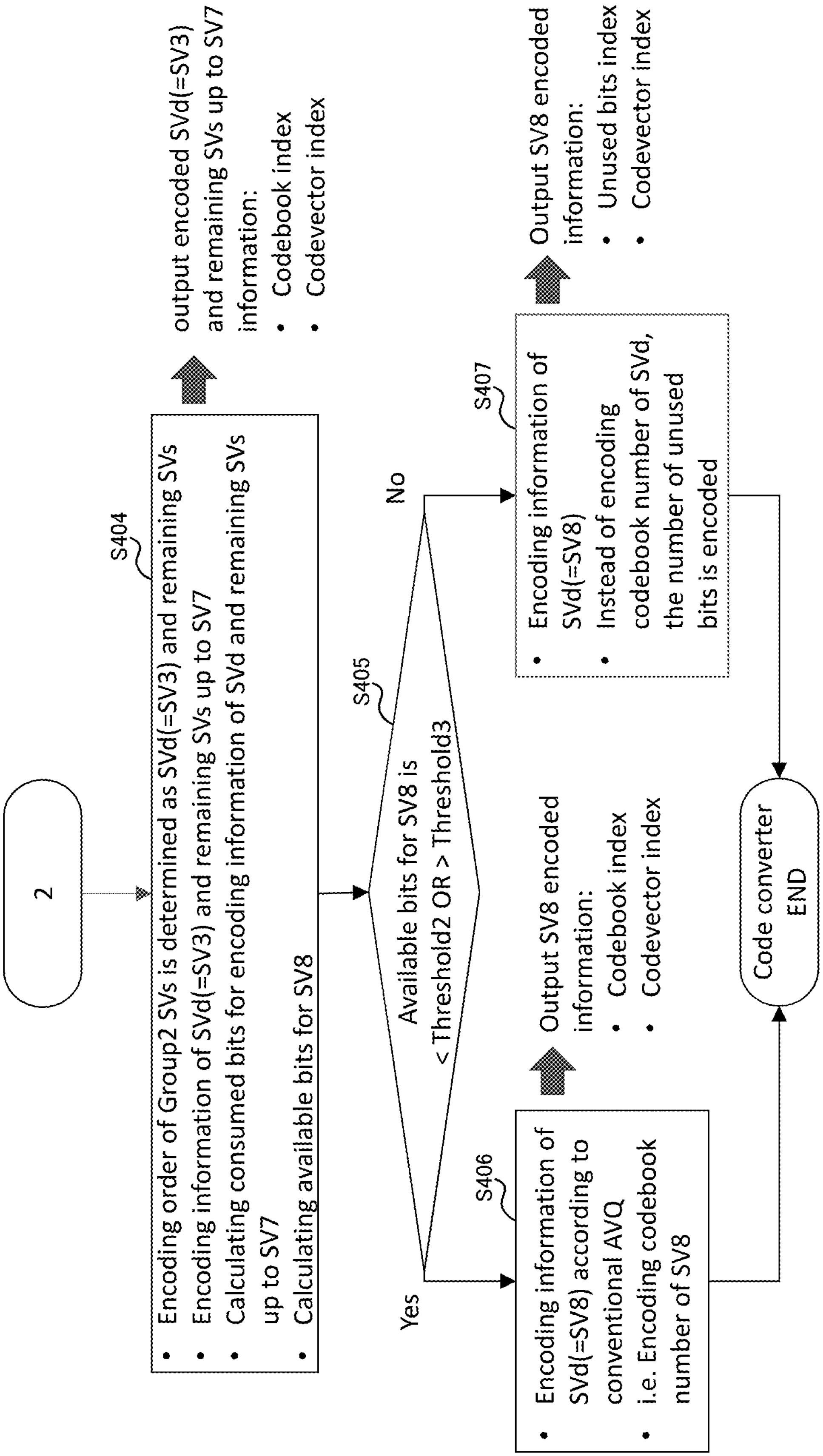
FIG. 14 is a flowchart showing an example of the code conversion.

In FIG. 14, encoding apparatus 300, for example, determines the order of encoding the sub-vectors in Group2 to SV3, SV4, SV5, SV6, SV7, and SV8, encodes SV3 to SV7, and outputs encoding information (for example, the codebook indicators and the codevector indices) (S404). Encoding apparatus 300 may, for example, determine the number of bits used to encode SV3 to SV7 and determine the number of bits available for encoding SV8 (S404).

In this way, when, for example, the number of bits available for encoding Group2 is less than Threshold1 (No in S403), encoding apparatus 300 does not need to perform code conversion (in other words, change the order of encoding) of the sub-vector SV3 in encoding Group2. In other words, when the number of bits available for encoding Group2 is less than Threshold1, encoding apparatus 300 may set (or change or update) the code conversion-targeted sub-vector from SV3 to the last sub-vector SV8 in Group2. Through this process, for example, it is possible to suppress occurrence of an insufficient number of bits in encoding the code conversion-targeted sub-vector.

Subsequently, encoding apparatus 300 may, for example, determine whether the number of bits available for encoding SV8 is less than the threshold Threshold2 or whether the number of bits available for encoding SV8 exceeds the threshold Threshold3 (S405).

When the number of bits available for encoding SV8 is less than Threshold2 or exceeds Threshold3 (Yes in S405), encoding apparatus 300 may, for example, encode SV8 by using an encoding method for AVQ (a method of encoding a codebook number), output encoding information (for example, the codebook indicator and the codevector index), and end the code conversion (S406). In this way, when the number of bits available for encoding SV8 is less than Threshold2 or exceeds Threshold3, the number of bits for encoding resulting from encoding the number of unused bits is not reduced, so encoding apparatus 300 may encode the codebook number without encoding the number of unused bits.

On the other hand, when the number of bits available for encoding SV8 is greater than or equal to Threshold2 and does not exceed Threshold3 (No in S405), encoding apparatus 300 may encode the number of unused bits instead of encoding the codebook number, output encoding information (for example, the unused-bit indicator and the codevector index), and end the code conversion (S407).

Here, for example, Threshold2 may be set to nine bits, and Threshold3 may be set to 80 bits. The reason why Threshold2 is set to nine bits is because, when, for example, the number of bits available for encoding SV8 is less than 10 bits, the number of bits used to encode the codebook number is also one bit in AVQ encoding, and the effect of reducing the number of bits resulting from code conversion is not obtained.

For example, Threshold3 may be set experimentally or empirically. For example, as the number of bits available for encoding SV8 increases, the number of unused bits is easier to increase, so Threshold3 may be set in order to avoid an increase in the number of unused bits. A case where the number of unused bits is large can be, for example, a case where information content is small as in the case where, for example, an encoding target is silence. Therefore, even when the effect of reducing bits is not obtained, there is no problem in terms of the quality of encoding. For this reason, for example, the number of bits that is large to a certain degree may be empirically set for Threshold3.

Figure 15:
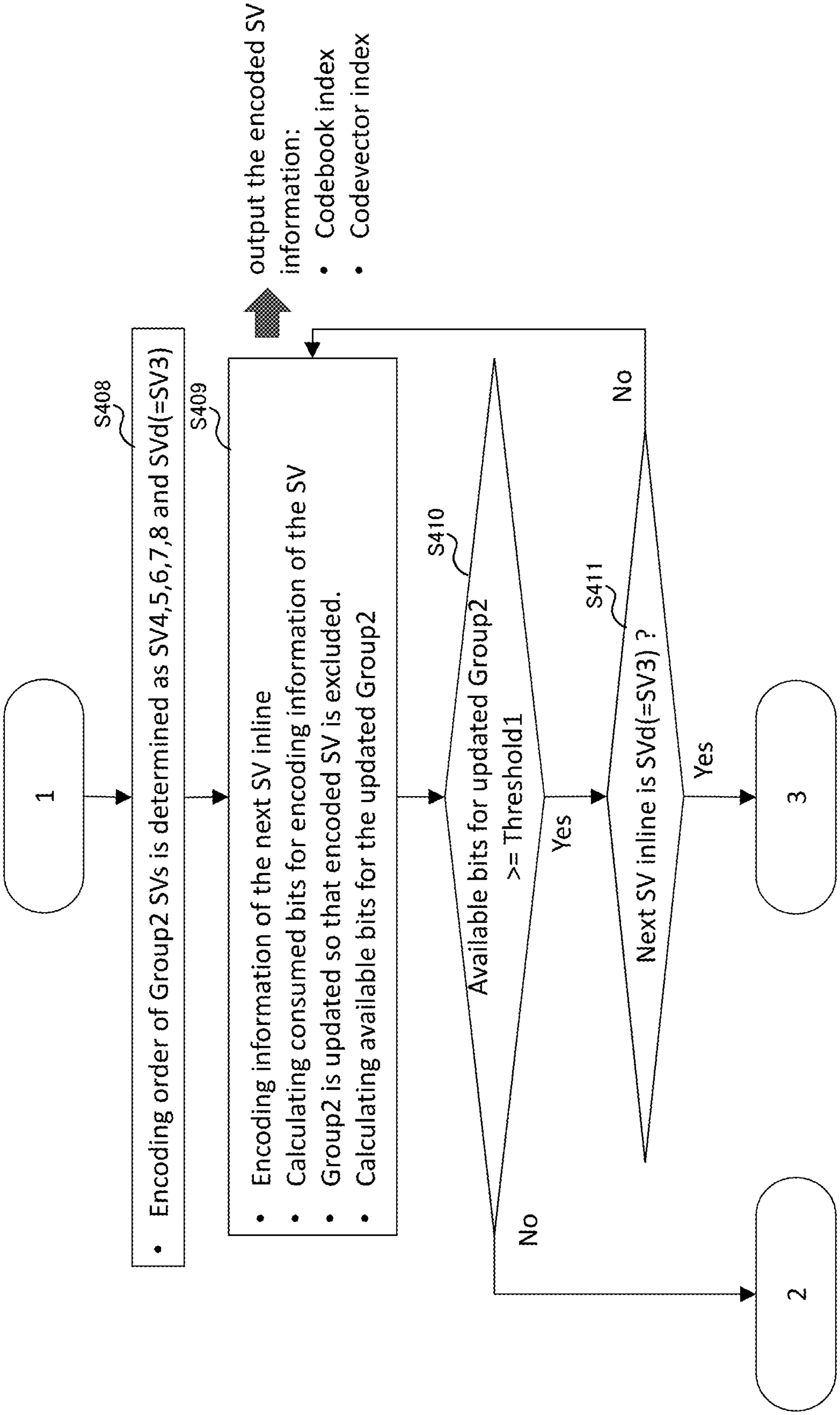
FIG. 15 is a flowchart showing an example of the code conversion.

In FIG. 15, encoding apparatus 300 may, for example, determine the order of encoding the sub-vectors in Group2 as SV4, SV5, SV6, SV7, SV8, and SV3 (S408). In other words, encoding apparatus 300 may set the code conversion-targeted sub-vector SVd=SV3 to the last sub-vector in Group2.

Subsequently, encoding apparatus 300 may, for example, encode the sub-vectors one by one in order of SV4, SV5, SV6, SV7, and SV8 and output encoding information (for example, the codebook indicators and the codevector indices) (S409). Encoding apparatus 300 may, for example, determine the number of bits used to encode the sub-vectors and determine (in other words, update) the number of bits available for encoding the remaining sub-vectors in Group2 (S409).

Subsequently, encoding apparatus 300, for example, determines whether the number of bits available for encoding the remaining sub-vectors in Group2 is greater than or equal to Threshold1 (S410).

When the number of bits available for encoding Group2 is less than Threshold1 (No in S410), encoding apparatus 300 may, for example, proceed to the process of S404 in FIG. 14, change the order of encoding the remaining sub-vectors in Group2 to the order of SV3, and the other remaining sub-vectors, and perform encoding of S404 to S407 in FIG. 14. These processes are intended to, when, for example, the number of bits available for encoding Group2 is not sufficient to encode all the remaining sub-vectors, return the order of encoding SV3 and encode SV3 first.

On the other hand, when the number of bits available for encoding Group2 is greater than or equal to Threshold1 (Yes in S410), encoding apparatus 300, for example, determines whether the sub-vector to be encoded next is SV3 (S411). When the sub-vector to be encoded next is not SV3 (code conversion-targeted sub-vector) (No in S411), encoding apparatus 300 may, for example, proceed to the process of S409 and encode the next sub-vector. Encoding apparatus 300 may, for example, repeat the processes of S409 to S411 and sequentially encode SV4, SV5, SV6, SV7, and SV8.

Figure 16:
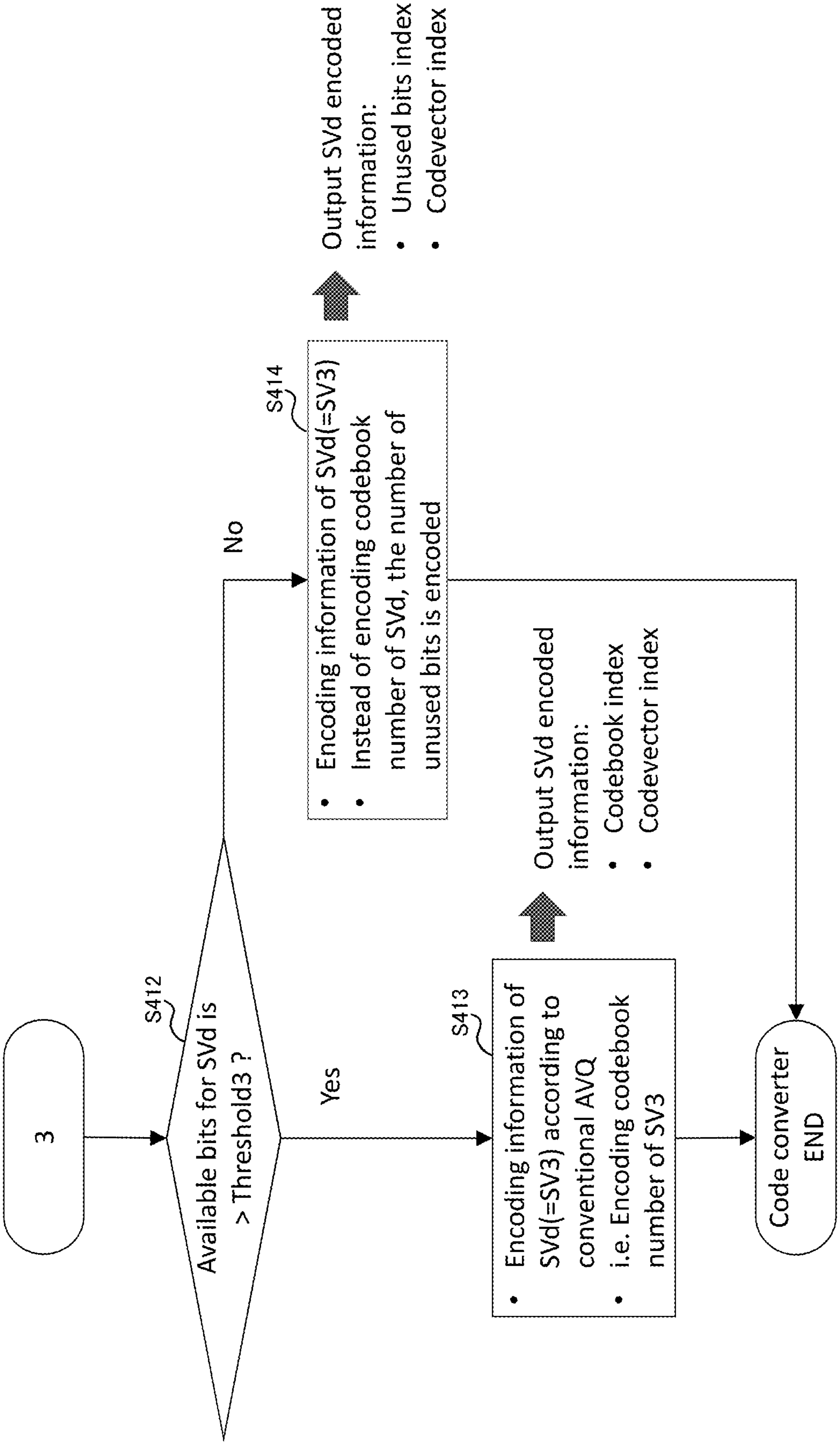
FIG. 16 is a flowchart showing an example of the code conversion.

When the sub-vector to be encoded next is SV3 (Yes in S411), encoding apparatus 300, for example, proceeds to the process of S412 shown in FIG. 16.

In FIG. 16, encoding apparatus 300 may, for example, determine whether the number of bits available for encoding SV3 (=SVd) exceeds Threshold3 (S412).

When the number of bits available for encoding SV3 exceeds Threshold3 (Yes in S412), encoding apparatus 300 may, for example, encode SV3 in accordance with AVQ encoding without code conversion, output encoding information (for example, the codebook indicator and the codevector index), and end the code conversion (S413). In this way, when the number of bits available for encoding SV3 exceeds Threshold3, the number of unused bits increases, and the number of bits of the unused-bit indicator is easier to increase, so encoding apparatus 300 may encode the codebook number.

On the other hand, when the number of bits available for encoding SV3 is less than or equal to Threshold3 (No in S412), encoding apparatus 300 may, for example, encode the number of unused bits instead of encoding the codebook number of SV3, output encoding information (for example, the codebook indicator and the codevector index), and end the code conversion (S414).

Next, another example of the operations of encoding apparatus 300 will be described.

Figure 17:
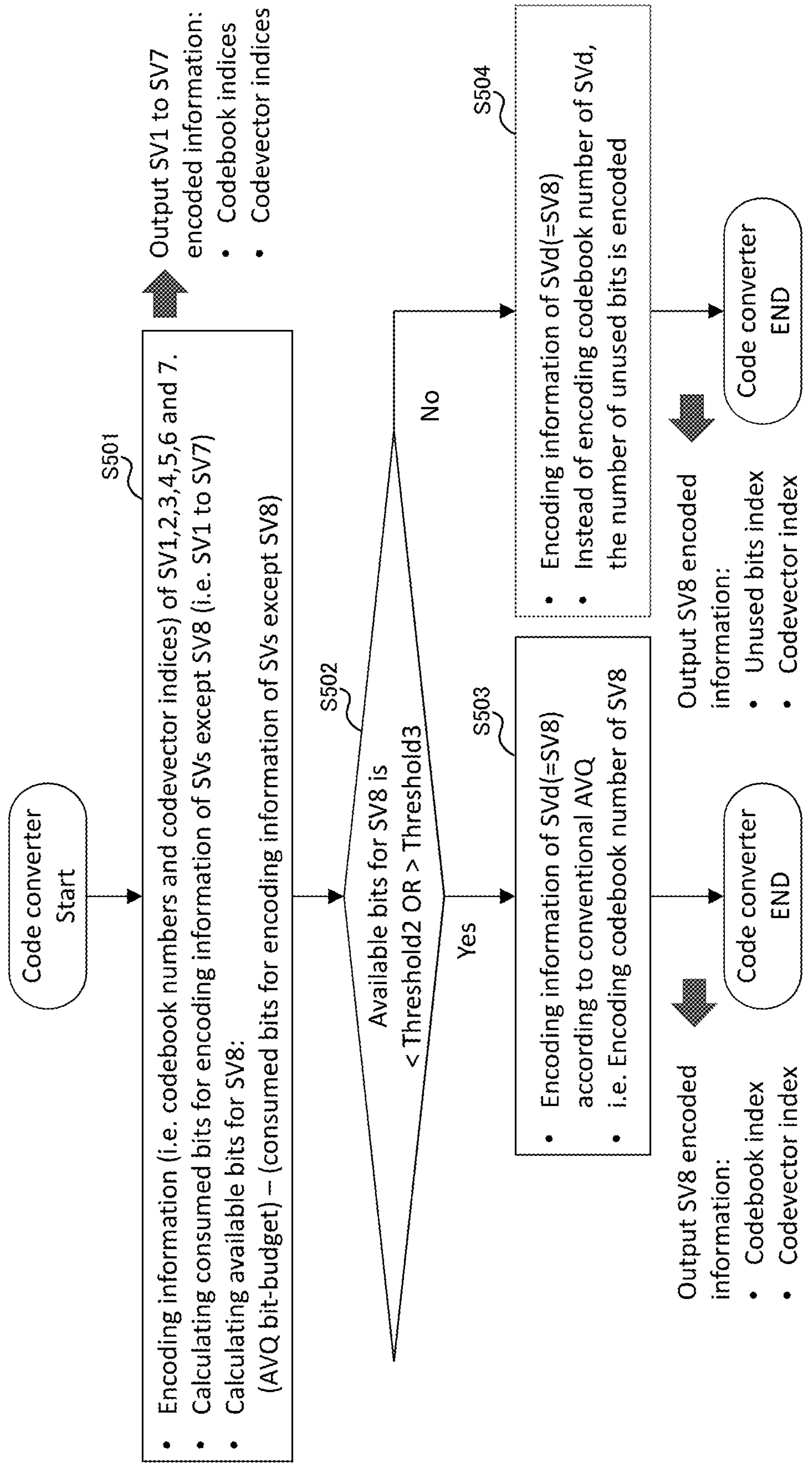
FIG. 17 is a flowchart showing another example of code conversion.

FIG. 17 is a flowchart showing an example of the operations of encoding apparatus 300. FIG. 17 shows an example of the operations of encoding apparatus 300 in an example in a case where the position of the code conversion-targeted sub-vector is the sub-vector SV8 (for example, the last sub-vector) at the highest position in a frequency domain.

The example of operations shown in FIG. 17 may be, for example, similar to the example of operations shown in FIG. 14. FIG. 14 shows an example of operations to, when the position of the sub-vector to be selected as a code conversion target is SV3 and code conversion of encoding information of SV3 is not possible (when, for example, the order of encoding the sub-vector cannot be changed to the last position in order to apply encoding of the number of unused bits to encoding of SV3), switch SV3 to SV8 for the code conversion-targeted sub-vector and determine whether encoding of the number of unused bits is applicable to encoding of SV8 (for example, whether the number of bits for encoding reduces when the number of unused bits is encoded rather than when the codebook number is encoded).

In FIG. 17, encoding apparatus 300, for example, encodes SV1 to SV7 and outputs encoding information (for example, the codebook indicators and the codevector indices) (S501). Encoding apparatus 300 may, for example, determine the number of bits used to encode SV1 to SV7 and determine the number of bits available for encoding SV8 (S501).

Subsequently, encoding apparatus 300 may, for example, determine whether the number of bits available for encoding SV8 is less than the threshold Threshold2 or whether the number of bits available for encoding SV8 exceeds the threshold Threshold3 (S502).

When the number of bits available for encoding SV8 is less than Threshold2 or exceeds Threshold3 (Yes in S502), encoding apparatus 300 may, for example, encode SV8 by using an encoding method for AVQ (for encoding a codebook number), output encoding information (for example, the codebook indicator and the codevector index), and end the code conversion (S503). In this way, when the number of bits available for encoding SV8 is less than Threshold2 or exceeds Threshold3, the number of bits for encoding resulting from encoding the number of unused bits is not reduced, so encoding apparatus 300 may encode the codebook number without encoding the number of unused bits.

On the other hand, when the number of bits available for encoding SV8 is greater than or equal to Threshold2 and does not exceed Threshold3 (No in S502), encoding apparatus 300 may encode the number of unused bits instead of encoding the codebook number, output encoding information (for example, the unused-bit indicator and the codevector index), and end the code conversion (S504).

In FIG. 17, for example, the values set in FIG. 14 may be applied to Threshold2 and Threshold3.

Next, an example of encoding of the number of unused bits in the process of S407 in FIG. 14, the process of S414 in FIG. 16, or the process of S504 in FIG. 17 will be described.

Figure 18:
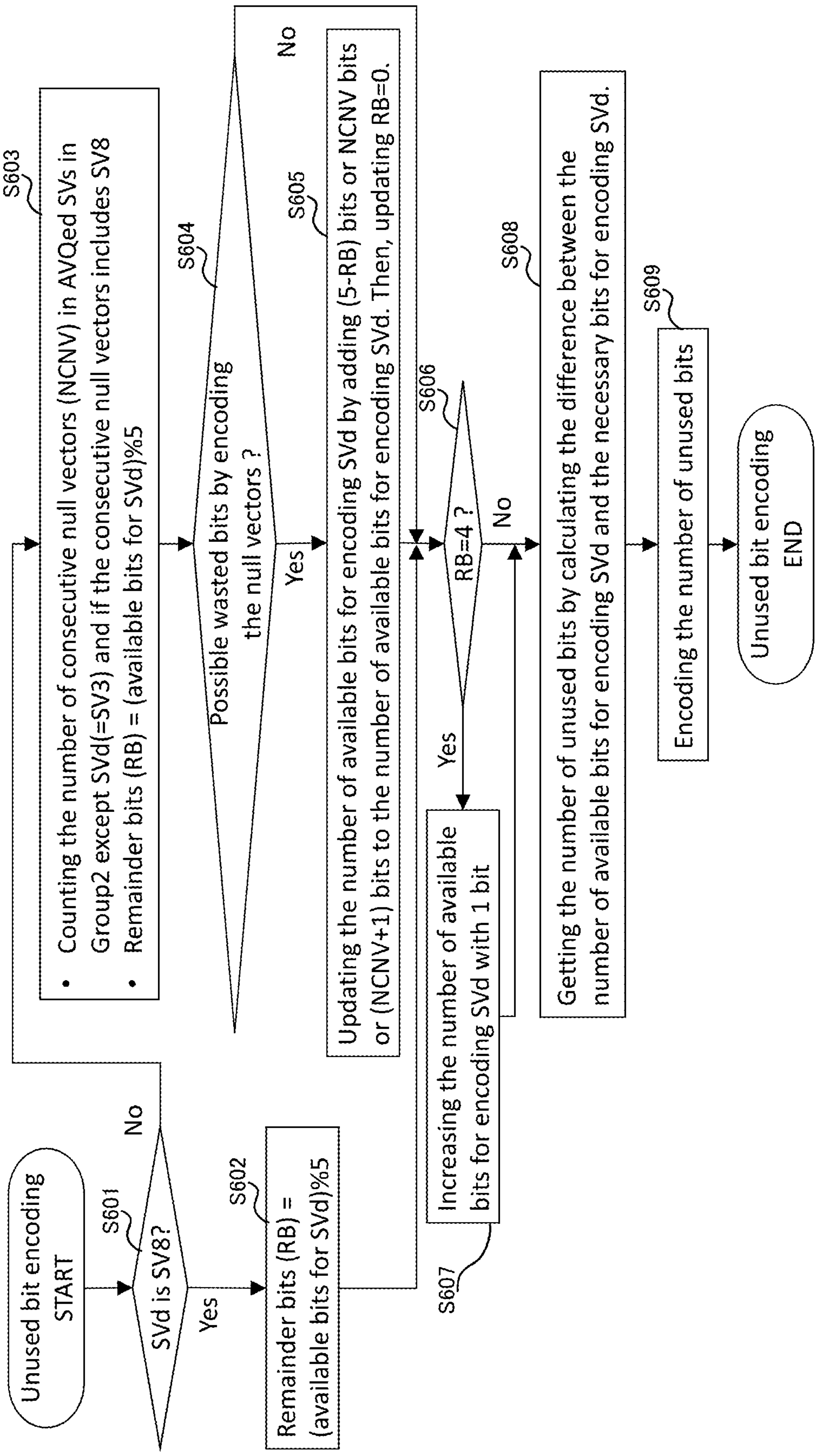
FIG. 18 is a flowchart showing an example of encoding of the number of unused bits.

FIG. 18 illustrates a flowchart of an example of encoding of the number of unused bits.

In FIG. 18, encoding apparatus 300 may, for example, determine whether the code conversion-targeted sub-vector is SV8 (S601). When the code conversion-targeted sub-vector is SV8 (Yes in S601), encoding apparatus 300 may, for example, calculate the remaining number of bits (hereinafter, referred to as RB) (S602). The remaining number of bits RB may be, for example, calculated by (Number of bits available for encoding the code conversion-targeted sub-vector) %5. Here, "%" denotes modulo operation. After the calculation of the remaining number of bits RB, encoding apparatus 300 proceeds to, for example, the process of S606.

On the other hand, when the code conversion-targeted sub-vector is not SV8 (for example, in a case of SV3) (No in S601), the order of encoding the sub-vectors is changed, so there is a possibility that the number of bits used to encode the sub-vectors after the order of encoding is changed is different from the number of bits in a case where encoding (for example, AVQ encoding) is performed without changing the order of encoding. In other words, there is a possibility that bits to be used wastefully (for example, wasted bits) occur as a result of changing the order of encoding. When, for example, the number of bits available for encoding becomes zero before encoding of the sub-vectors halfway and, therefore, the subsequent sub-vectors (for example, the consecutive sub-vectors including SV8) forcibly become zero vectors without being encoded (in other words, encoded with zero bits), wasted bits can occur.

In the present embodiment, when the code conversion-targeted sub-vector is not SV8 (No in S601), encoding apparatus 300, for example, counts the number of consecutive sub-vectors (hereinafter, referred to as NCNV) of which the quantization parameters are null vectors (referred to as all-zero vectors or zero vectors) among sub-vectors to be AVQ encoded, and checks whether SV8 (for example, the last sub-vector) is included in the sub-vectors that are null vectors (S603). In other words, NCNV may indicate the number of consecutive sub-vectors that are null vectors including SV8.

Further, encoding apparatus 300 may, for example, calculate the remaining number of bits RB (S603). The remaining number of bits RB may be, for example, calculated by (Number of bits available for encoding the code conversion-targeted sub-vector) %5. Here, "%" denotes modulo operation.

Subsequently, encoding apparatus 300 may, for example, determine whether there is a possibility that wasted bits occur as a result of changing the order of encoding the sub-vectors (S604). Encoding apparatus 300 may, for example, determine whether there is a possibility that wasted bits occur based on NCNV and RB (an example of determination will be described later). When there is no possibility that wasted bits occur (No in S604), encoding apparatus 300, for example, proceeds to the process of S606.

On the other hand, when there is a possibility that wasted bits occur (Yes in S604), encoding apparatus 300 may, for example, update the number of bits available for encoding the code conversion-targeted sub-vector (for example, SVd) (S605). For example, encoding apparatus 300 may add (5−RB) bits, NCNV bits, or (NCNV+1) bits to the number of bits available for encoding the code conversion-targeted sub-vector depending on the condition. In other words, encoding apparatus 300 may, for example, increase the number of bits available for encoding the code conversion-targeted sub-vector by the number of wasted bits (for example, the number of bits that is possibly used wastefully). Further, encoding apparatus 300 may, for example, update the remaining number of bits RB to zero (S605). Note that an exemplary process of updating the number of bits available for encoding the code conversion-targeted sub-vector will be described later.

A value "5" used to calculate the number of bits to be added (for example, 5−RB) and to calculate a remaining number of bits RB is an example. For example, the value may be defined in accordance with the proportion (for example, ⅕) of the number of bits allocated to a codebook with respect to the entire number of bits used to encode the plurality of sub-vectors or a value that is a multiple of the number of bits used to encode sub-vectors.

Subsequently, encoding apparatus 300, for example, determines whether the remaining number of bits RB is four (S606). When RB is not four (No in S606), encoding apparatus 300 may, for example, proceed to the process of S608, and may perform determination of the number of unused bits.

When RB is four (Yes in S606), encoding apparatus 300 may, for example, increase by one bit the number of bits available for encoding the code conversion-targeted sub-vector (S607).

Subsequently, encoding apparatus 300 may, for example, determine the number of unused bits (S608). For example, encoding apparatus 300 may calculate a difference between the number of bits available for the code conversion-targeted sub-vector and the number of bits used to encode the code conversion-targeted sub-vector (for example, the number of bits unused) as the number of unused bits.

Encoding apparatus 300 may, for example, encode the calculated number of unused bits (S609).

Next, an example of a method of determining whether there is a possibility that wasted bits occur as a result of changing the order of encoding sub-vectors in the process of S604 in FIG. 18 will be described.

For example, encoding apparatus 300 may determine that there is a possibility that wasted bits occur when the following Condition 1 and Condition 2 are satisfied. In other words, encoding apparatus 300 may determine that there is no possibility that wasted bits occur when either the following Condition 1 or Condition 2 is not satisfied.

Condition 1: Quantized SV8 (or SV8 to be decoded) is a null vector.

Condition 2: RB+NCNV≥4

For example, for Condition 1, when SV8 is not a null vector, all the plurality of sub-vectors (for example, SV1 to SV8) is encoded in AVQ encoding, so the number of bits used for encoding remains unchanged even when the order of encoding of the sub-vectors is changed or not changed. Thus, when SV8 is not a null vector, no wasted bit can occur. In other words, when SV8 is a null vector, there is a possibility that wasted bits occur.

Condition 1 may be set to "NCNV>0," for example. When NCNV>0 is satisfied, at least SV8 is a null vector.

For example, for Condition 2, wasted bits occur only when, for example, the number of unused bits (for example, the number of bits to be unused in AVQ encoding) is zero.

Here, for example, the remaining number of bits RB corresponds to an excess number of bits due to a reduction (or insufficiency) of the number of bits available for encoding SVd as a result of a wasteful use of bits caused by changing the order of encoding. For example, the number of bits NCNV corresponds to the number of bits (wasted bits) that may be wastefully used as a result of changing the order of encoding.

Thus, when wasted bits occur, RB+NCNV can be greater than or equal to five. While, for example, the number of bits used to encode the sub-vectors is a multiple of five (for example, 5n), the last one bit (stop bit) of the codebook indicator can be omitted, so RB+NCNV can be a value greater than or equal to four. In this way, in Condition 2, when the number of unused bits is zero, RB+NCNV can be greater than or equal to four. In other words, when RB+NCNV is greater than or equal to four, there is a possibility that unused bits are zero and wasted bits occur. On the other hand, when RB+NCNV is less than four, unused bits are present, so no wasted bit can occur.

Condition 2 may also be set as follows.

Condition 2': Where the remaining number of bits is denoted by RB, the number of consecutive sub-vectors (including SV8) that are null vectors is denoted by NCNVV, and an estimated codebook number is denoted by ECBI, (Number of bits available for SVd)+NCNVV≥5×ECBI+4.

Here, it is also applicable that ECBI=(INT)((Number of bits available for SVd)/5). The function (INT)(X) may be a function that returns a value obtained by discarding all the digits to the right of the decimal point of X.

Next, an exemplary process of updating the number of bits available for encoding the code conversion-targeted sub-vector in encoding apparatus 300 is described.

Figure 19:
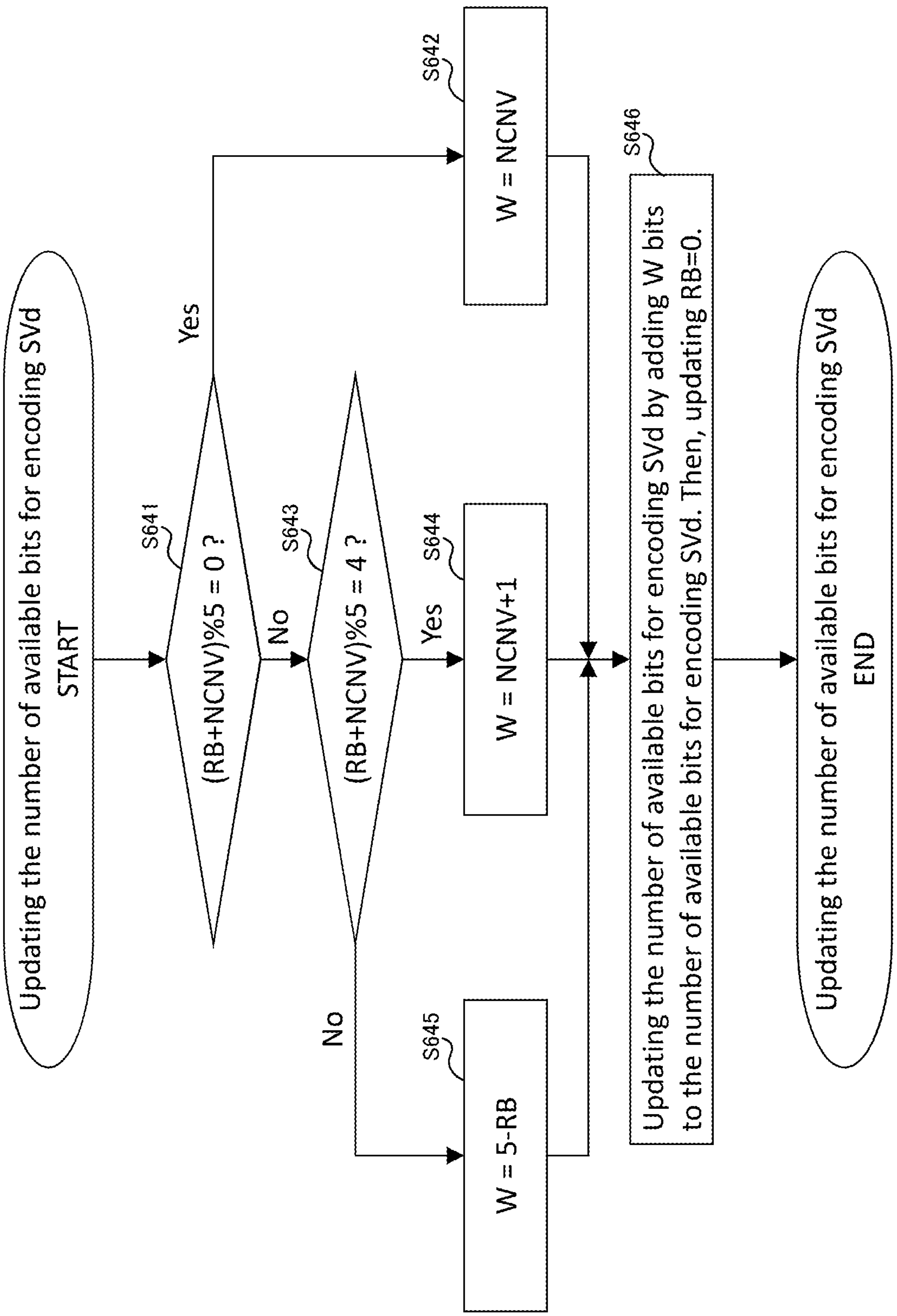
FIG. 19 is a flowchart showing an example of the process of updating the number of bits available for encoding a code conversion-targeted sub-vector.

FIG. 19 illustrates a flowchart of an exemplary process of updating the number of bits available for encoding a code conversion-targeted sub-vector in encoding apparatus 300.

For example, when it is determined that there is a possibility that waste bits occur (Yes in S604 in FIG. 18), encoding apparatus 300 may add NCNV bits, (NCNV+1) bits, or (5−RB) bits to the number of bits available for encoding the code conversion-targeted sub-vector as the number of waste bits, depending on the conditions on the remaining number of bits (for example, remainder obtained by dividing, by five, the number of bits available for encoding the code conversion-targeted sub-vector) RB and the number of consecutive sub-vectors NCNV of which the quantization parameters are null vectors.

For example, when (RB+NCNV) %5 is zero (Yes in S641), encoding apparatus 300 may set the number of addition bits (hereinafter, referred to as "W") to NCNV bits (S642).

Further, for example, when (RB+NCNV) %5 is four (No in S641 and Yes in S643), encoding apparatus 300 may set the number of addition bits W to (NCNV+1) bits (S644).

Further, for example, when (RB+NCNV) %5 is neither zero nor four (No in S641 and No in S643), encoding apparatus 300 may set the number of addition bits W to (5−RB) bits (S645).

Then, encoding apparatus 300 may, for example, add the number of addition bits W to the number of bits available for encoding the code conversion-targeted sub-vector, thereby updating the number of bits available for encoding the code conversion-targeted sub-vector (S646). By the process of S646, the number of bits available for encoding the code conversion-targeted sub-vector is set to a multiple of five. In this case, the remaining number of bits RB is zero, and thus encoding apparatus 300 may, for example, update the remaining number of bits RB to zero.

The number of bits used for encoding sub-vectors is herein a multiple of five as an example. Further, for example, as for sub-vectors to be AVQ encoded, the number of consecutive sub-vectors NCNV of which the quantization parameters are null vectors can be five or greater. For example, when the code conversion-targeted sub-vector is SV3 among SV1 to SV8, NCNV can be five (e.g., corresponding to SV4 to SV8).

When NCNV is five or greater, for example, the number of bits available for encoding the code conversion-targeted sub-vector possibly decreases by five bits or greater from the original number of bits (hereinafter, referred to as "5n" bits) (n is an integer of two or more) due to occurrence of waste bits. In this case, even though (5−RB) bits are simply added when the number of bits available for the code conversion-targeted sub-vector is updated, the number of bits available for the code conversion-targeted sub-vector is possibly set to the number of bits smaller than the original number of bits (5n bits) (for example, 5(n−1) bits).

Concerning this point, as illustrated in FIG. 19, encoding apparatus 300 adds NCNV bits to the number of bits available for encoding the code conversion-targeted sub-vector when (RB+NCNV) %5=0. Thus, for example, even when NCNV is five or greater (e.g., RB+NCNV=5 or 10), encoding apparatus 300 can set the number of bits available for encoding the code conversion-targeted sub-vector to an appropriate value (e.g., 5n bits) in consideration of NCNV bits.

Further, as described above, while the number of bits used to encode the sub-vectors is a multiple of five, the last one bit (stop bit) of the codebook indicator can be omitted, for example. In this case, (RB+NCNV) %5 can be four. As illustrated in FIG. 19, when (RB+NCNV) %5 is four, encoding apparatus 300 adds (NCNV+1) bits to the number of bits available for encoding the code conversion-targeted sub-vector. Thus, for example, even when NCNV is five or greater, encoding apparatus 300 can set the number of bits available for encoding the code conversion-targeted sub-vector to an appropriate value (e.g., 5n bits) in consideration of a stop bit.

Note that, in FIG. 19, an example has been described in which the process of S641 is based on the result of (RB+NCNV) %5, but the present disclosure is not limited thereto. For example, in a case where NCNV is five or greater, encoding apparatus 300 may set the number of addition bits W to NCNV when (RB+NCNV) %5 is not four, and may set the number of addition bits W to (NCNV+1) bits when (RB+NCNV) %5 is four. Further, for example, in a case where NCNV is less than five, encoding apparatus 300 may set the number of addition bits W to (5−RB) bits. Note that decoding apparatus 400 (for example, the processing of FIG. 28 described later) may also perform the same processing.

Further, in FIG. 19, a case has been described in which the process of S641 is based on the remainder obtained by dividing (RB+NCNV) by five, but the present disclosure is not limited thereto. For example, encoding apparatus 300 may set the number of addition bits W based on a remainder obtained by dividing (RB+NCNV) by 10. In this case, encoding apparatus 300 can also appropriately set the number of bits available for encoding the code conversion-targeted sub-vector (for example, 5n bits) when NCNV is five or greater. Further, for example, when the number of sub-vectors set in AVQ encoding is greater than eight, RB+NCNV can be 15 or greater. In this case, encoding apparatus 300 may set the number of addition bits W based on a remainder obtained by dividing (RB+NCNV) by 15 or more of a multiple of 5. Note that decoding apparatus 400 (for example, the processing of FIG. 28 described later) may also perform the same processing.

Figure 20:
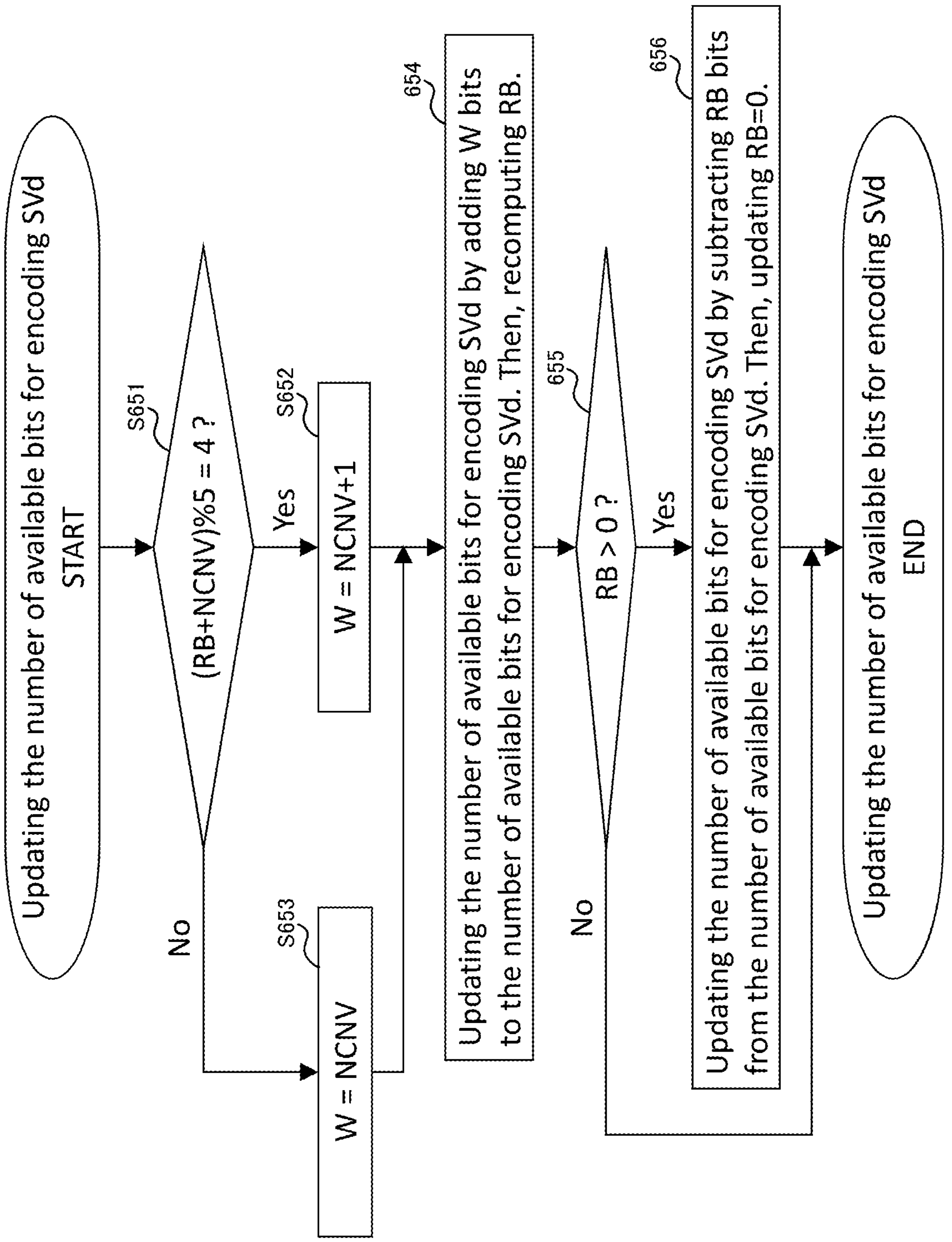
FIG. 20 is a flowchart showing another example of the process of updating the number of bits available for encoding the code conversion-targeted sub-vector.

FIG. 20 shows another flowchart of the exemplary process of updating the number of bits available for encoding the code conversion-targeted sub-vector in encoding apparatus 300.

For example, when it is determined that there is a possibility that waste bits occur (Yes in S604 in FIG. 18), encoding apparatus 300 may add NCNV bits or (NCNV+1) bits to the number of bits available for encoding the code conversion-targeted sub-vector as the number of waste bits, depending on the conditions on the remaining number of bits RB and the number of consecutive sub-vectors NCNV of which the quantization parameters are null vectors.

That is, in FIG. 20, unlike FIG. 19, encoding apparatus 300 does not add (5−RB) bits when updating the number of bits available for encoding the code conversion-targeted sub-vector.

For example, encoding apparatus 300 may set the number of addition bits W to (NCNV+1) bits when (RB+NCNV) %5 is four (Yes in S651) (S652), and may set the number of addition bits W to NCNV when (RB+NCNV) %5 is not four (No in S651) (S653).

Then, encoding apparatus 300 may, for example, add the number of addition bits W to the number of bits available for encoding the code conversion-targeted sub-vector, thereby updating the number of bits available for encoding the code conversion-targeted sub-vector (S654).

In addition, encoding apparatus 300 may recalculate the remaining number of bits RB for the number of bits available for encoding the code conversion-targeted sub-vector after (NCNV+1) bits or NCNV bits are added, for example (S654). By the addition of NCNV bits, the recalculated remaining number of bits RB can be RB>0.

Encoding apparatus 300 determines, for example, whether the recalculated remaining number of bits RB is greater than 0 (S655). In other words, encoding apparatus 300 determines whether the recalculated remaining number of bits RB (or the updated number of available bits) is a true value.

When RB is not greater than zero (No in S655), encoding apparatus 300 may end the process of FIG. 20.

On the other hand, when RB is greater than zero (Yes in S655), encoding apparatus 300 may update the number of bits available for encoding the code conversion-targeted sub-vector by subtracting the remaining number of bits RB from the number of bits available for encoding the code conversion-targeted sub-vector after (NCNV+1) bits or NCNV bits are added, for example (S656). Further, encoding apparatus 300 may, for example, update the remaining number of bits RB to zero.

In FIG. 20, by the processes of S652 and S653, encoding apparatus 300 can appropriately set the number of bits available for encoding the code conversion-targeted sub-vector even when NCNV is five or greater. Additionally, by the process of S656, the number of bits available for encoding the code conversion-targeted sub-vector can be adjusted to a multiple of five.

As illustrated in FIG. 19 or 20, encoding apparatus 300 sets (for example, updates) the number of bits available for encoding the code conversion-targeted sub-vector depending on the conditions on the remaining number of bits RB and the number of consecutive sub-vectors NCNV of which the quantization parameters are null vectors. Thus, for example, encoding apparatus 300 can set the number of bits available for encoding the code conversion-targeted sub-vector to an appropriate value even when NCNV is five or greater.

Further, decoding apparatus 400 to be described later cannot identify the number of wasted bits, but can identify RB and NCNV. In the present embodiment, for example, encoding apparatus 300 (and decoding apparatus 400 to be described later) can appropriately set the number of bits available for encoding the code conversion-targeted sub-vector using RB and NCNV, which are parameters identifiable by decoding apparatus 400.

Next, an example of operations of an AVQ decoder according to the present embodiment is described.

Figure 21:
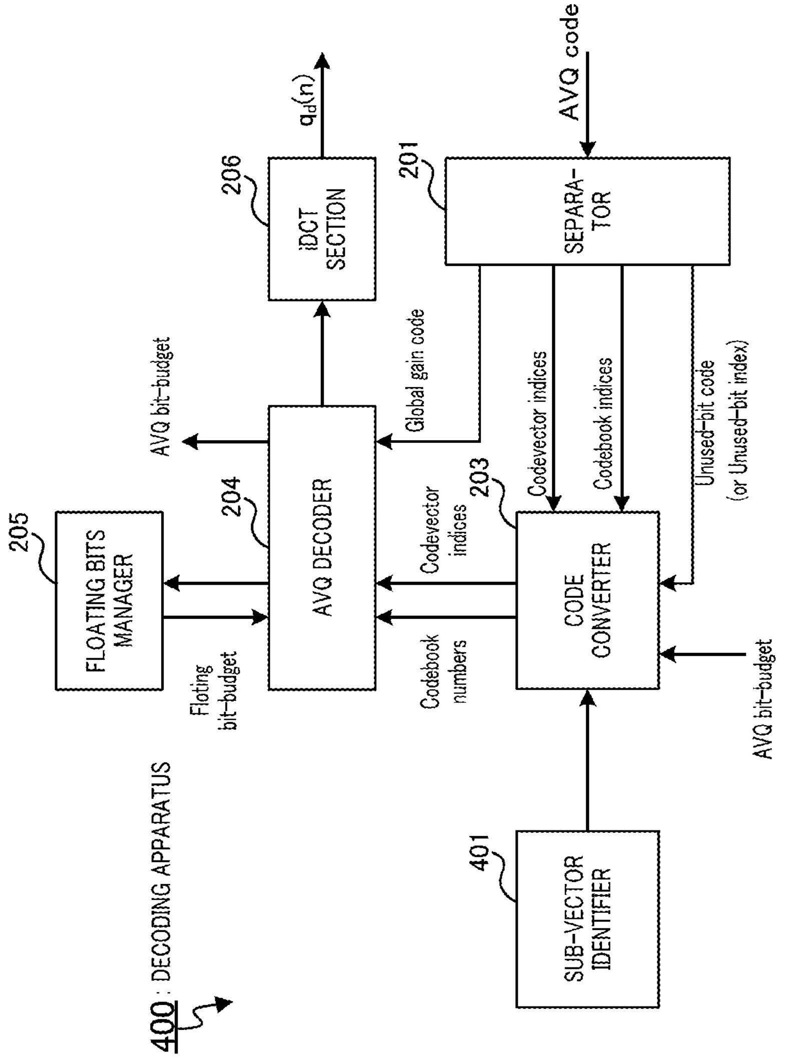
FIG. 21 is a block diagram illustrating an example of the configuration of a decoding apparatus according to Embodiment 2.

FIG. 21 is a block diagram showing an example of the configuration related to AVQ decoder (hereinafter, referred to as a decoding apparatus for the sake of convenience) 400 according to an embodiment of the present disclosure. In FIG. 21, like reference signs are assigned to components that perform similar processes to those of decoding apparatus 200 shown in FIG. 11.

In FIG. 21, sub-vector identifier 401 may output information on the position of a predetermined sub-vector (referred to as, for example, a target sub-vector or a fixed sub-vector) to code converter 203. The predetermined sub-vector may be, for example, any one of eight sub-vectors (for example, SV1 to SV8). For example, hereinafter, a case where, of the eight sub-vectors SV1 to SV8, the predetermined sub-vector is the third sub-vector (for example, SV3) or the last sub-vector (for example, SV8) in ascending order in a frequency domain will be described.

Sub-vector identifier 401 does not need to execute any signal processing or, for example, does not need to explicitly include any constituent element for identifying (designating) a sub-vector at a predetermined specific position. In FIG. 21, in an example, sub-vector identifier 401 may be a memory that holds the position of the predetermined sub-vector.

In decoding apparatus 400 shown in FIG. 21, the operations of the components different from sub-vector identifier 401 may be similar to the operations of decoding apparatus 200 shown in FIG. 11.

Next, an example of the operations of decoding apparatus 400, different from Embodiment 2, will be described.

A method of selecting a code conversion-targeted sub-vector may be similar to the method shown in FIG. 5. In the present embodiment, code converter 203 may use position information of the predetermined sub-vector instead of dominant sub-vector information. Selection of a sub-vector may be, for example, performed not by code converter 203 but by sub-vector identifier 401. In this case, AVQ bit-budget information may be input to sub-vector identifier 401, and information on a sub-vector to be selected may be input to code converter 203 as the position information of the sub-vector.

FIGS. 22 to 25 are flowcharts showing an example of the operations of decoding apparatus 400. FIGS. 22 to 25 illustrate an example of the operations of decoding apparatus 400 in an example in a case where the position of the code conversion-targeted sub-vector is the third sub-vector SV3 in ascending order in a frequency domain.

In the description of FIGS. 22 to 25, the plurality of sub-vectors SV1 to SV8 and the thresholds Threshold1, Threshold2, and Threshold3 may be similar to those of FIGS. 13 to 16.

Figure 22:
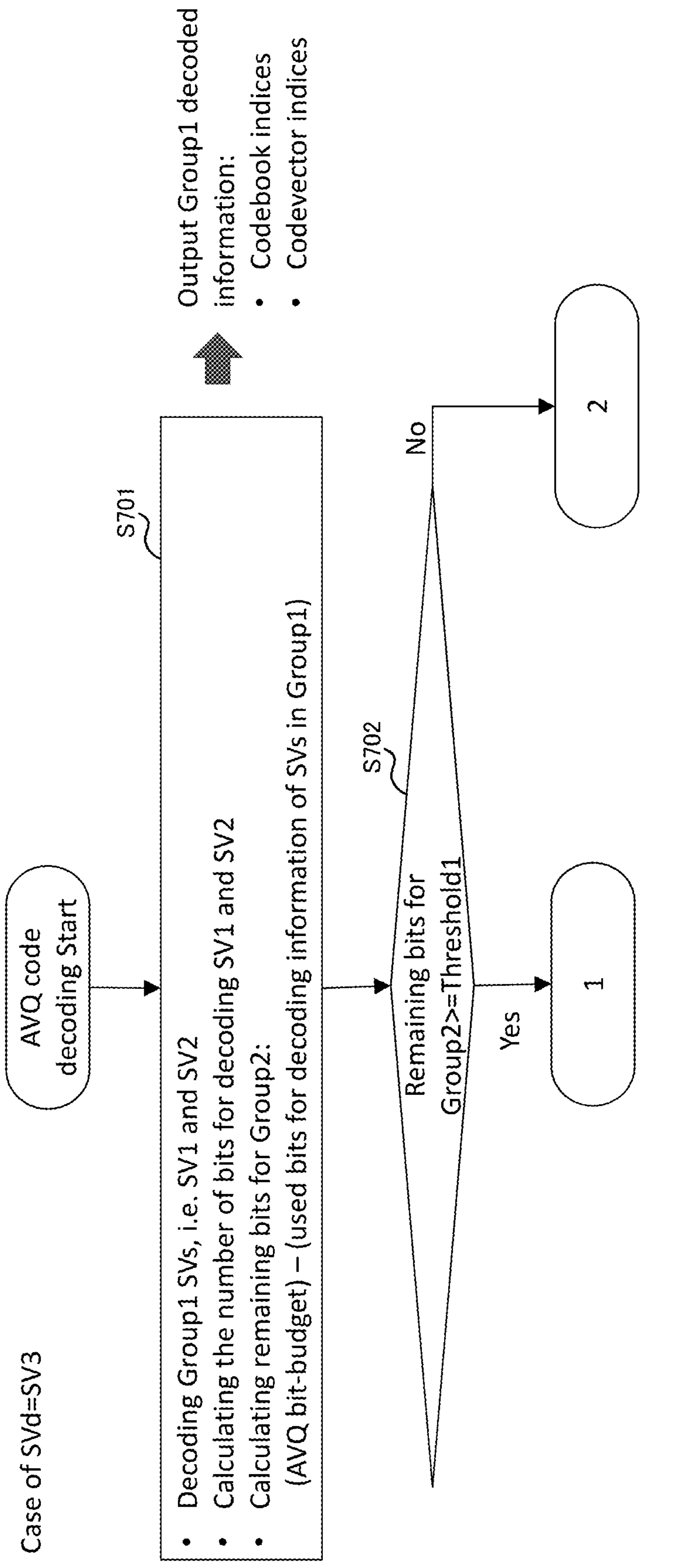
FIG. 22 is a flowchart showing an example of the decoding.

In FIG. 22, decoding apparatus 400 may, for example, decode sub-vectors (for example, SV1 and SV2) in Group1 and output decoded information (for example, the codebook numbers and the codevector indices) (S701). Decoding apparatus 400 may, for example, calculate the number of bits of a bit stream (bit string) used to decode the sub-vectors (for example, SV1 and SV2) in Group1, and calculate the remaining number of bits (remaining bits) as a bit stream for the sub-vectors in Group2 by subtracting the number of bits used to decode SV1 and SV2 from the number of bits allocated to overall AVQ (for example, AVQ bit-budget) (S701).

Subsequently, decoding apparatus 400, for example, determines whether the number of bits remaining as a bit stream for the sub-vectors in Group2 is greater than or equal to the threshold Threshold1 (S702). For example, decoding apparatus 400 proceeds to a process shown in FIG. 23 (for example, the process of S703) when the number of bits remaining as a bit stream for the sub-vectors in Group2 is less than the Threshold1 threshold (No in S702), and proceeds to a process shown in FIG. 24 (for example, the process of S707) when the number of bits remaining as a bit stream for the sub-vectors in Group2 is greater than or equal to Threshold1 (Yes in S702).

Figure 23:
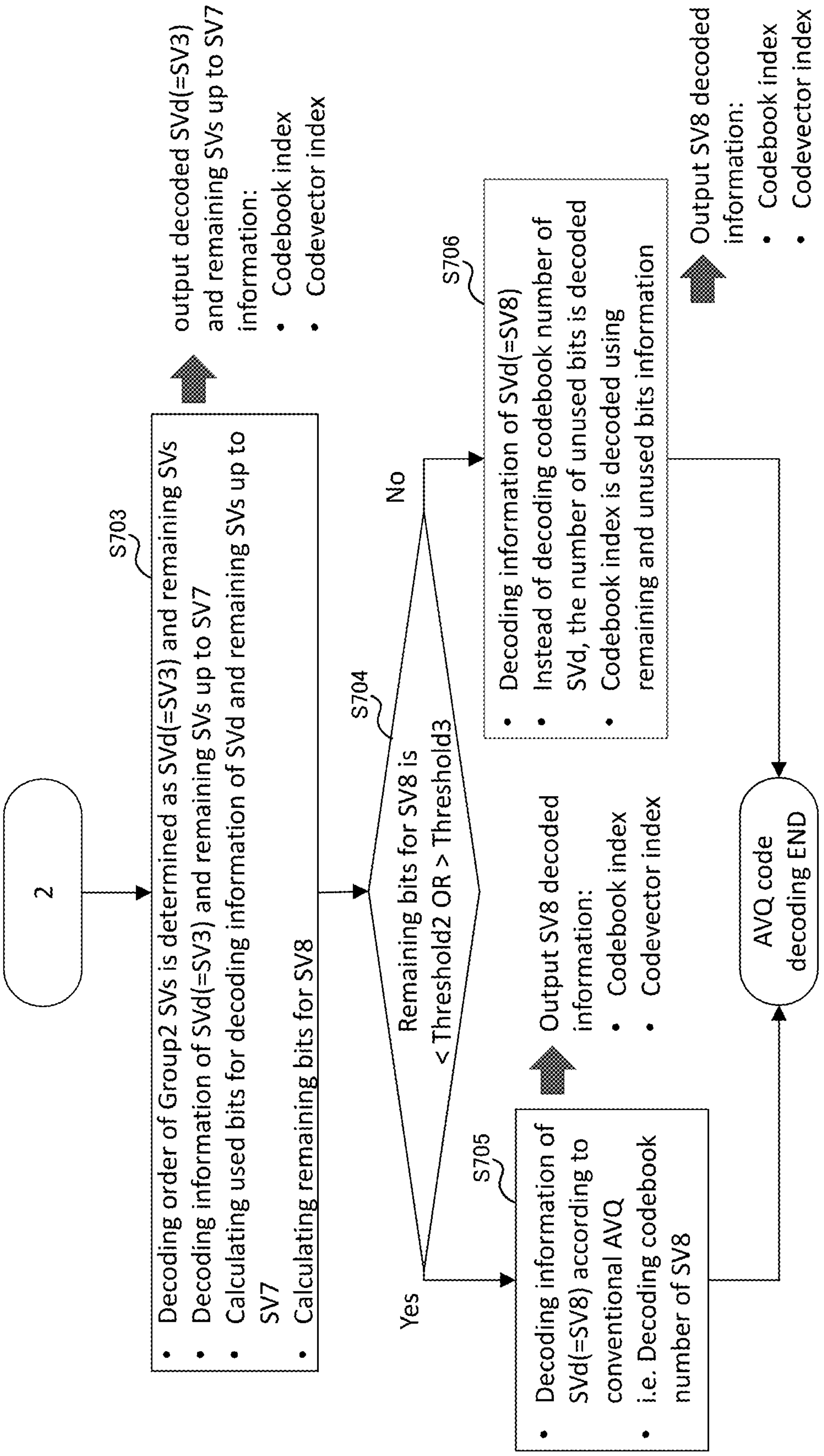
FIG. 23 is a flowchart showing an example of the decoding.

In FIG. 23, decoding apparatus 400, for example, determines (or interprets) the order of encoding the sub-vectors in Group2 as SV3, SV4, SV5, SV6, SV7, and SV8, decodes each of SV3 to SV7, and outputs the decoded results (the codebook numbers and the codevector indices) (S703). Decoding apparatus 400 may, for example, calculate the number of bits of bit streams used to decode SV3 to SV7, and calculate the number of bits remaining as a bit stream (encoding code) for SV8 (S703).

In this way, when, for example, the number of bits remaining as a bit stream for the sub-vectors in Group2 is less than Threshold1 (No in S702), decoding apparatus 400 may determine that code conversion (in other words, changing the order of encoding) of the code conversion-targeted sub-vector SV3 is not performed in encoding apparatus 100.

Subsequently, decoding apparatus 400 may, for example, determine whether the number of bits remaining as a bit stream for SV8 is less than the threshold Threshold2 or exceeds the threshold Threshold3 (S704).

When the number of bits remaining as a bit stream for SV8 is less than Threshold2 or exceeds Threshold3 (Yes in S704), decoding apparatus 400 may, for example, determine that SV8 is encoded by the AVQ encoding method (the method of encoding the codebook number), decode SV8, output decoded information (for example, the codebook number and the codevector index), and end the decoding (S705).

On the other hand, when the number of bits remaining as a bit stream for SV8 is greater than or equal to Threshold2 and does not exceed Threshold3 (No in S704), decoding apparatus 400, for example, determines that the number of unused bits is encoded instead of the codebook number of SV8, and decodes the number of unused bits and the codevector index (S706). Decoding apparatus 400 may, for example, determine the codebook number of SV8 in accordance with the number of bits remaining as a bit stream for SV8 and the number of unused bits decoded (S706). An example of a method of determining a codebook number will be described later. Decoding apparatus 400 may output the determined decoded information (for example, the codebook number and the codevector index) of SV8, and end the decoding.

Figure 24:
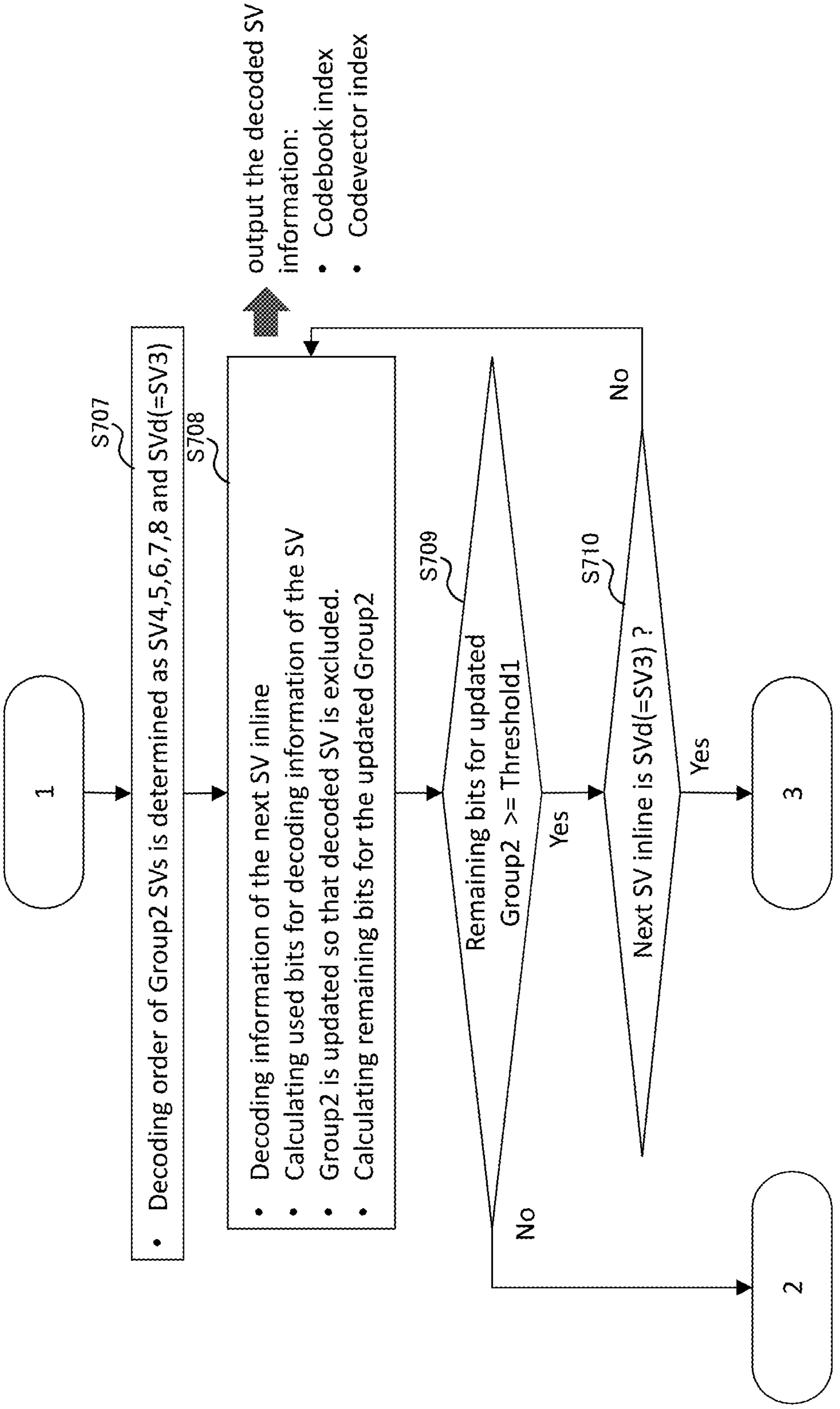
FIG. 24 is a flowchart showing an example of the decoding.

In FIG. 24, decoding apparatus 400 may, for example, determine (or interpret) the order of encoding the sub-vectors in Group2 as SV4, SV5, SV6, SV7, SV8, and SV3 (S707). In other words, decoding apparatus 400 may set the code conversion-targeted sub-vector SVd=SV3 to the last sub-vector in Group2.

Subsequently, decoding apparatus 400 may, for example, decode the sub-vectors one by one in order of SV4, SV5, SV6, SV7, and SV8, and output decoded information (for example, the codebook numbers and the codevector indices) (S708). Decoding apparatus 400 may, for example, determine the number of bits of a bit stream used to decode the sub-vectors, and determine the number of bits of a bit stream for the remaining sub-vectors in Group2 (S708).

Subsequently, decoding apparatus 400, for example, determines whether the number of bits of a bit stream for the remaining sub-vectors in Group2 is greater than or equal to Threshold1 (S709).

When the number of bits of a bit stream for the remaining sub-vectors in Group2 is less than Threshold1 (No in S709), decoding apparatus 400 may, for example, proceed to the process of S703 in FIG. 23, change the order of encoding the remaining sub-vectors in Group2 to the order of SV3 and the other remaining sub-vectors, and perform decoding processing of S703 to S706 in FIG. 23.

On the other hand, when the number of bits of a bit stream for the remaining sub-vectors in Group2 is greater than or equal to Threshold1 (Yes in S709), decoding apparatus 400, for example, determines whether the sub-vector to be decoded next is SV3 (S710). When the sub-vector to be decoded next is not SV3 (code conversion-targeted sub-vector) (No in S710), decoding apparatus 400 may, for example, proceed to the process of S708, and perform decoding of the next sub-vector. Decoding apparatus 400 may, for example, repeat the processes of S708 to S710, and sequentially decode SV4, SV5, SV6, SV7, and SV8.

Figure 25:
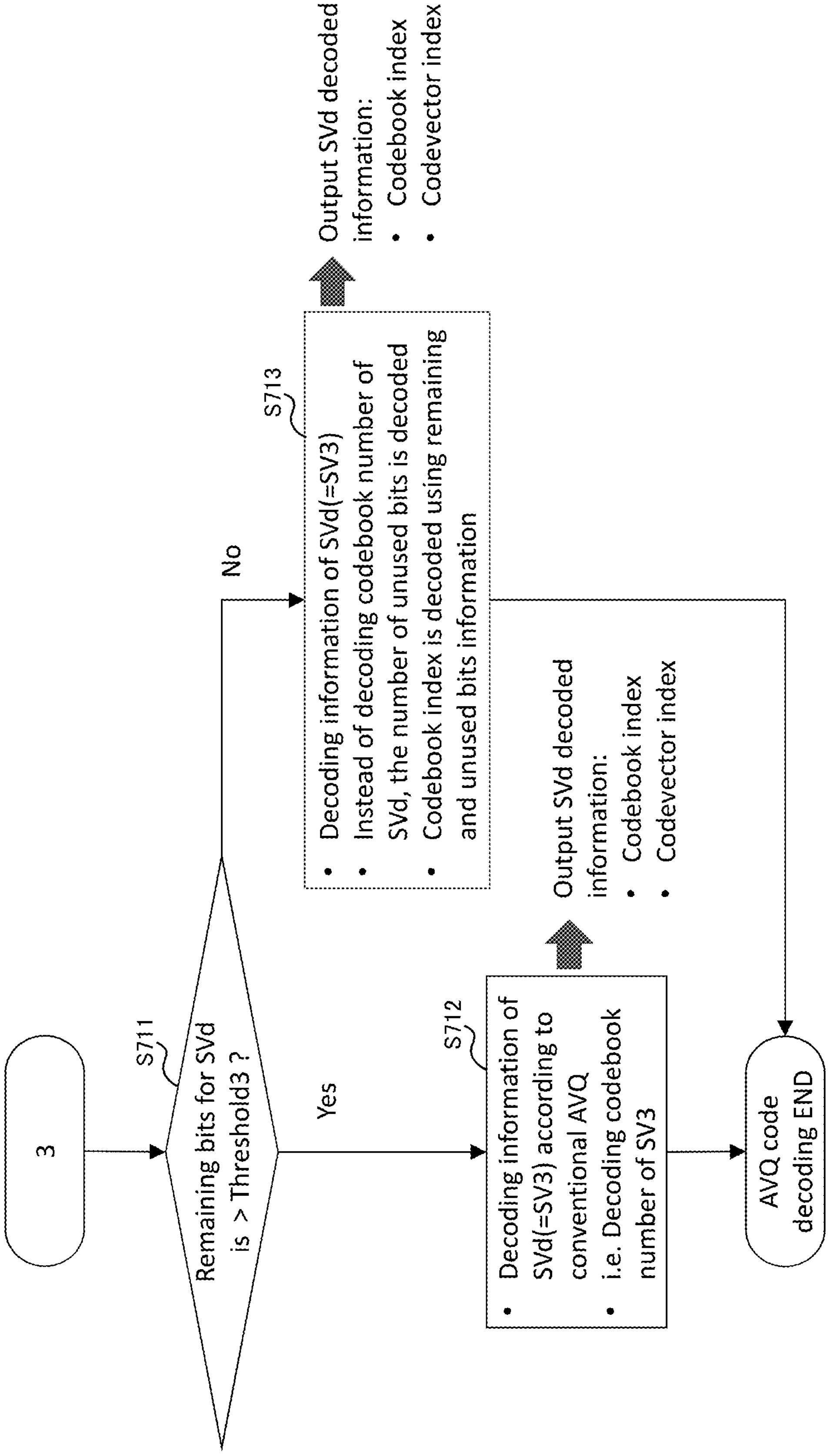
FIG. 25 is a flowchart showing an example of the decoding.

When the sub-vector to be decoded next is SV3 (Yes in S710), decoding apparatus 400, for example, proceeds to the process of S711 shown in FIG. 25.

In FIG. 25, decoding apparatus 400 may, for example, determine whether the number of bits remaining as a bit stream for SV3 (=SVd) exceeds Threshold3 (S711).

When the number of bits remaining as a bit stream for SV3 exceeds Threshold3 (Yes in S711), decoding apparatus 400 may, for example, decode SV3 in accordance with the AVQ encoding method without code conversion, output decoded information (for example, the codebook number and the codevector index), and end the decoding (S712).

On the other hand, when the number of bits remaining as a bit stream for SV3 is less than or equal to Threshold3 (No in S711), decoding apparatus 400 may, for example, decode an unused-bit indicator instead of the codebook number of SV3, and decode the codevector index (S713). Decoding apparatus 400 may, for example, determine the codebook number of SV3 in accordance with the number of bits remaining as a bit stream for SV3 and decoded unused bits information (S713). Decoding apparatus 400 may, for example, output the codebook number and the codevector index of SV3, and end the decoding. An example of a method of determining a codebook number will be described later.

Next, another example of the operations of decoding apparatus 400 will be described.

Figure 26:
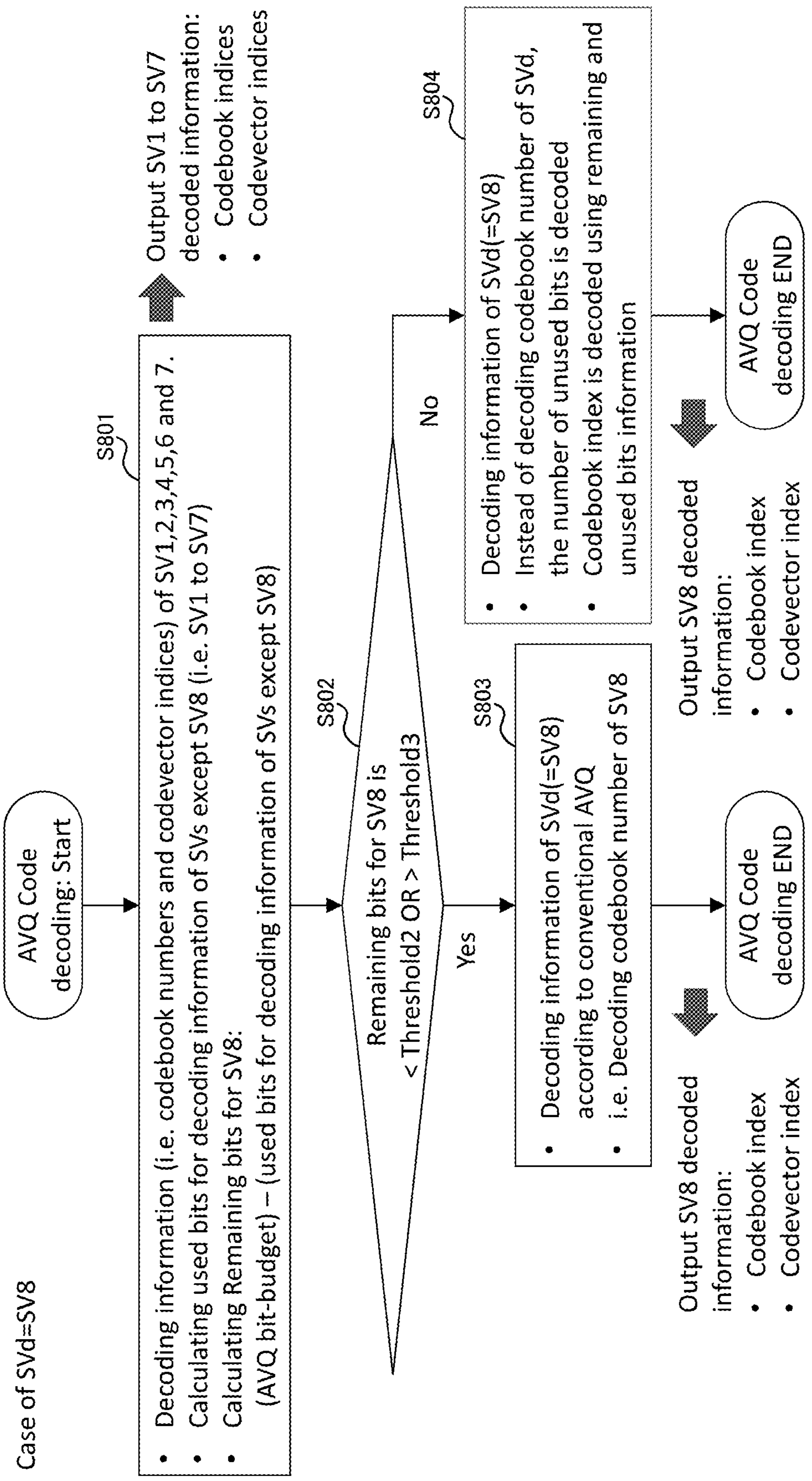
FIG. 26 is a flowchart showing another example of the decoding.

FIG. 26 is a flowchart showing another example of the operations of decoding apparatus 400. FIG. 26 shows an example of the operations of decoding apparatus 400 in an example in a case where the position of the code conversion-targeted sub-vector is the sub-vector SV8 (for example, the last sub-vector) at the highest position in a frequency domain.

For example, the process of FIG. 26 is an example of decoding corresponding to the encoding shown in FIG. 17. The example of operations shown in FIG. 26 may be, for example, similar to the example of operations shown in FIG. 23.

In FIG. 23, decoding apparatus 400, for example, decodes SV1 to SV7, and outputs decoded information (for example, the codebook numbers and the codevector indices) (S801). Decoding apparatus 400 may, for example, determine the number of bits of bit streams used to decode SV1 to SV7, and determine the number of bits remaining as a bit stream for SV8 (S801).

Subsequently, decoding apparatus 400 may, for example, determine whether the number of bits remaining as a bit stream for SV8 is less than the threshold Threshold2 or exceeds the threshold Threshold3 (S802).

When the number of bits remaining as a bit stream for SV8 is less than Threshold2 or exceeds Threshold3 (Yes in S802), decoding apparatus 400 may, for example, determine that SV8 is encoded by the AVQ encoding method (the method of encoding the codebook number), decode SV8, output decoded information (for example, the codebook number and the codevector index), and end the decoding (S803).

On the other hand, when the number of bits remaining as a bit stream for SV8 is greater than or equal to Threshold2 and does not exceed Threshold3 (No in S802), decoding apparatus 400, for example, determines that the number of unused bits is encoded instead of the codebook number of SV8, and decodes the number of unused bits and the codevector index (S804). Decoding apparatus 400 may, for example, determine the codebook number of SV8 in accordance with the number of bits remaining as a bit stream for SV8 and the number of unused bits decoded (S804). An example of a method of determining a codebook number will be described later. Decoding apparatus 400 may output the determined decoded information (for example, the codebook number and the codevector index) of SV8, and end the decoding.

Next, an example of decoding of SVd (for example, SV3 or SV8) in the process of S706 in FIG. 23, the process of S713 in FIG. 25, or the process of S804 in FIG. 26 will be described.

Figure 27:
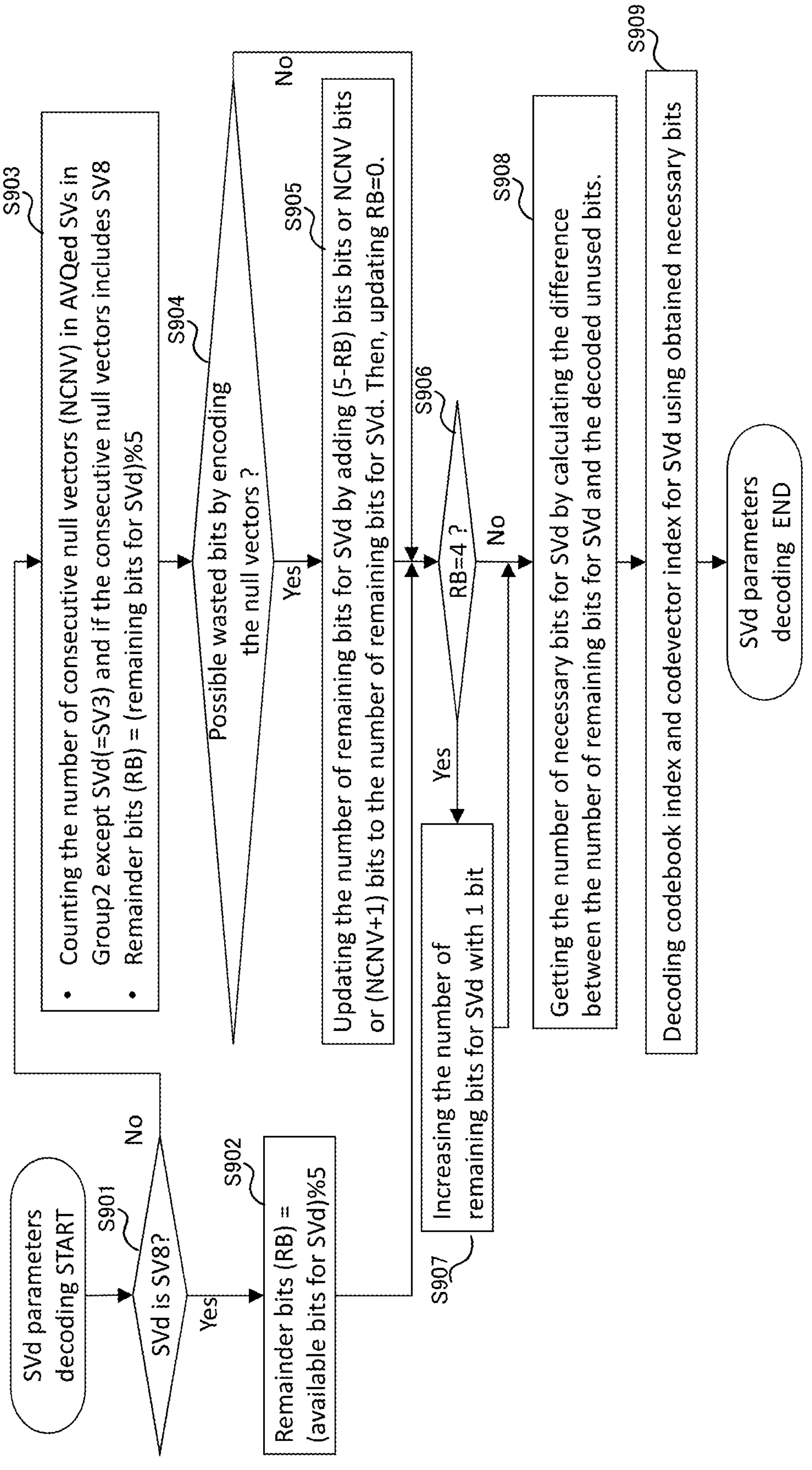
FIG. 27 is a flowchart showing an example of the decoding based on the number of unused bits.

FIG. 27 shows a flowchart of an example of decoding of SVd. The process shown in FIG. 27 may, for example, correspond to the encoding illustrated in FIG. 18. The process shown in FIG. 27 includes, for example, a procedure to determine the codebook number of SVd in accordance with the number of bits remaining as a code bit stream for SVd and the number of unused bits.

In FIG. 27, decoding apparatus 400 may, for example, determine whether the code conversion-targeted sub-vector is SV8 (S901). When the code conversion-targeted sub-vector is SV8 (Yes in S901), decoding apparatus 400 may, for example, calculate the remaining number of bits RB (S902). The remaining number of bits RB may be, for example, calculated by (Number of bits available for encoding the code conversion-targeted sub-vector) %5. Here, "%" denotes modulo operation. After the remaining number of bits RB is calculated, decoding apparatus 400, for example, proceeds to the process of S906.

On the other hand, when the code conversion-targeted sub-vector is not SV8 (here, the code conversion-targeted sub-vector is, for example, SV3) (No in S901), decoding apparatus 400 may, for example, count the number of consecutive sub-vectors (including SV8) (for example, NCNV) of which the quantization parameters are null vectors (zero vectors) among the decoded sub-vectors (S903).

Decoding apparatus 400 may, for example, calculate the remaining number of bits (for example, RB) (S903). The remaining number of bits RB may be, for example, calculated by (Number of bits remaining as a code bit stream for the code conversion-targeted sub-vector (for example, SV3)) %5. Here, "%" denotes modulo operation.

Subsequently, decoding apparatus 400 may, for example, determine whether to update the number of bits remaining as a bit stream for SVd (for example, SV3) based on NCNV and RB (S904). In other words, decoding apparatus 400 may, for example, determine whether there is a possibility that wasted bits have occurred as a result of changing the order of encoding the sub-vectors. A determining method in S904 may be similar to the determining method in encoding apparatus 300.

When there is no possibility that wasted bits have occurred (No in S904), decoding apparatus 400, for example, proceeds to the process of S906.

On the other hand, when there is a possibility that wasted bits have occurred (Yes in S904), decoding apparatus 400 may, for example, update the number of bits remaining as a bit stream for the code conversion-targeted sub-vector (for example, SVd) (S905). For example, decoding apparatus 400 may add (5−RB) bits, NCNV bits, or (NCNV+1) bits to the number of bits remaining as a bit stream for the code conversion-targeted sub-vector depending on the condition. In other words, decoding apparatus 400 may, for example, increase the number of bits remaining as a bit stream for SVd by the number of wasted bits (for example, the number of bits that are possibly used wastefully). Decoding apparatus 400 may, for example, update the remaining number of bits RB to zero (S905). An exemplary process of updating the number of bits remaining as a bit stream for the code conversion-targeted sub-vector will be described later.

Subsequently, decoding apparatus 400, for example, determines whether the remaining number of bits RB is four (S906). When RB is not four (No in S906), decoding apparatus 400 may, for example, proceed to the process of S908, and determine the code length of SVd obtained by AVQ encoding in accordance with the number of unused bits (an example will be described later).

When RB is four (Yes in S906), decoding apparatus 400 may, for example, increase by one bit the number of bits remaining as a bit stream for the code conversion-targeted sub-vector (S907).

Subsequently, decoding apparatus 400 may, for example, determine the code length of SVd obtained by AVQ encoding in accordance with unused bits information (S908). For example, decoding apparatus 400 may subtract the number of unused bits to be decoded, from the number of bits remaining as a bit stream for the code conversion-targeted sub-vector and calculate the code length of SVd (for example, the number of bits of a code (bit stream) obtained through AVQ encoding).

In an example, as shown in FIG. 10, when a correlation between the number of unused bits and a code (unused-bit indicator) is defined, the code length of SV8 may be determined as follows.

$$(\text{Code length of } SV8) = (INT((\text{Number of bits remaining as encoded bit stream for } SV8) - ((\text{Number of bits in FIG. 10}) - 1)\times 5)/5) + 1)\times 5$$

When, for example, (Number of bits remaining as encoded bit stream for SV8)=13 bits and (Code of the number of unused bits)=10, the code length of SV8 is (INT((13−5)/5)+1)×5=10 bits. When (Code of the number of unused bits)=10, the number of unused bits to be decoded is any one of one to five in accordance with FIG. 10. When the number of bits remaining as an encoded bit stream for SV8 is 13, the number of unused bits to be decoded may be identified as three. This is because the code length of the sub-vector is set to a multiple of five.

Subsequently, decoding apparatus 400 may, for example, decode the codebook number and the codevector index of SVd in accordance with the code length of SVd (S909). In an example, when the code length of SV8 is 10 bits, decoding apparatus 400 may decode the codebook number=2 in accordance with FIG. 1.

Next, an exemplary process of updating the number of bits remaining as a bit stream for the code conversion-targeted sub-vector in decoding apparatus 400 is described.

Figure 28:
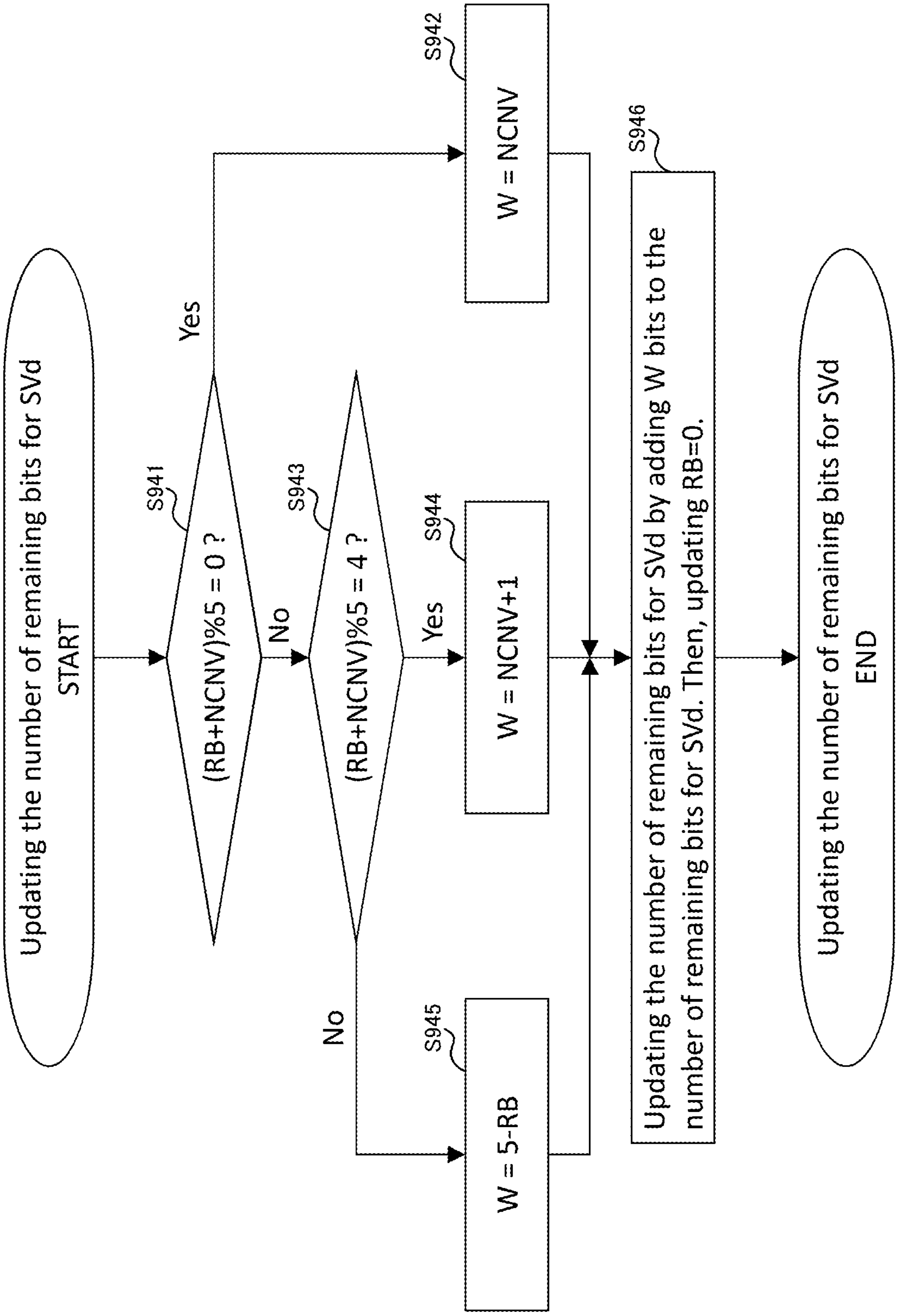
FIG. 28 is a flowchart showing an example of the process of updating the number of bits remaining as a bit stream for the code conversion-targeted sub-vector.

FIG. 28 is a flowchart illustrating an exemplary process of updating the number of bits remaining as a bit stream for the code conversion-targeted sub-vector in decoding apparatus 400. The process of decoding apparatus 400 illustrated in FIG. 28 corresponds to, for example, the process of encoding apparatus 300 illustrated in FIG. 19.

For example, when it is determined that there is a possibility that waste bits have occurred (Yes in S904 in FIG. 27), decoding apparatus 400 may add NCNV bits, (NCNV+1) bits, or (5−RB) bits as a waste number of bits to the number of bits remaining as a bit stream for the code conversion-targeted sub-vector, depending on the conditions on the remaining number of bits (remainder obtained by dividing the number of bits remaining as a bit stream for the code conversion-targeted sub-vector by five) RB and the number of consecutive sub-vectors NCNV of which the quantization parameters are null vectors.

For example, when (RB+NCNV) %5 is zero (Yes in S941), decoding apparatus 400 may set the number of addition bits (hereinafter, referred to as "W") to NCNV bits (S942).

Further, for example, when (RB+NCNV) %5 is four (No in S941 and Yes in S943), decoding apparatus 400 may set the number of addition bits W to (NCNV+1) bits (S944).

Further, for example, when (RB+NCNV) %5 is neither zero nor four (No in S941 and No in S943), decoding apparatus 400 may set the number of addition bits W to (5−RB) bits (S945).

Then, decoding apparatus 400 may, for example, add the number of addition bits W to the number of bits remaining as a bit stream for the code conversion-targeted sub-vector, thereby updating the number of bits remaining as the bit stream for the code conversion-targeted sub-vector (S946). By the process of S946, the number of bits remaining as the bit stream of the code conversion-targeted sub-vector is set to a multiple of five. In this case, since the remaining number of bits RB is zero, decoding apparatus 400 may, for example, update the remaining number of bits RB to zero.

FIG. 29 is another flowchart illustrating an exemplary process of updating the number of bits remaining as a bit stream for the code conversion-targeted sub-vector in decoding apparatus 400. The process of decoding apparatus 400 illustrated in FIG. 29 corresponds to, for example, the process of encoding apparatus 300 illustrated in FIG. 20.

For example, when it is determined that there is a possibility that waste bits have occurred (Yes in S904 in FIG. 27), decoding apparatus 400 may add NCNV bits or (NCNV+1) bits as a waste number of bits to the number of bits remaining as a bit stream for the code conversion-targeted sub-vector, depending on the conditions on the remaining number of bits RB and the number of consecutive sub-vectors NCNV of which the quantization parameters are null vectors.

That is, in FIG. 29, unlike FIG. 28, decoding apparatus 400 does not add (5−RB) bits when updating the number of bits remaining as a bit stream for the code conversion-targeted sub-vector.

For example, decoding apparatus 400 may set the number of addition bits W to (NCNV+1) bits when (RB+NCNV) %5 is four (Yes in S951) (S952), and may set the number of addition bits W to NCNV when (RB+NCNV) %5 is not four (No in S951) (S953).

Then, decoding apparatus 400 may, for example, add the number of addition bits W to the number of bits remaining as a bit stream for the code conversion-targeted sub-vector, thereby updating the number of bits remaining as a bit stream for the code conversion-targeted sub-vector (S954).

In addition, decoding apparatus 400 may recalculate the remaining number of bits RB for the number of bits remaining as a bit stream for the code conversion-targeted sub-vector after (NCNV+1) bits or NCNV bits are added, for example (S954). By the addition of NCNV bits, the recalculated remaining number of bits RB can be RB>0.

Decoding apparatus 400 determines, for example, whether the recalculated remaining number of bits RB is greater than zero (S955). In other words, decoding apparatus 400 determines whether the recalculated remaining number of bits RB (or the updated number of available bits) is a true value.

When RB is not greater than zero (No in S955), decoding apparatus 400 may end the process of FIG. 29.

On the other hand, when RB is greater than zero (Yes in S955), decoding apparatus 400 may update the number of bit remaining as a bit stream for the code conversion-targeted sub-vector by subtracting the remaining number of bits RB from the number of bits remaining as a bit stream for the code conversion-targeted sub-vector after (NCNV+1) bits or NCNV bits are added (S956). Decoding apparatus 400 may, for example, update the remaining number of bits RB to zero.

As illustrated in FIG. 28 or 29, decoding apparatus 400 sets (for example, updates) the number of bits remaining as a bit stream for the code conversion-targeted sub-vector depending on the conditions on the remaining number of bits RB and the number of consecutive sub-vectors NCNV of which the quantization parameters are null vectors. Thus, for example, decoding apparatus 400 can set the number of bits remaining as a bit stream for the code conversion-targeted sub-vector to an appropriate value even when NCNV is five or greater, Further, decoding apparatus 400 can appropriately set the number of bits remaining as a bit stream for the code conversion-targeted sub-vector using RB and NCNV, which are parameters identifiable by decoding apparatus 400.

For example, decoding apparatus 400 may decode the code book number and the code vector index for the code conversion-targeted sub-vector based on the setting of the number of bits remaining as a bit stream for the code conversion-targeted sub-vector as described above, and may perform AVQ decoding (for example, inverse vector quantization) based on the decoding result.

As described above, in the present embodiment, encoding apparatus 300 determines which one of encoding of the codebook number of the code conversion-targeted sub-vector and encoding which is based on a difference between the number of bits allocated to vector quantization and the number of bits of quantization parameters (for example, encoding of the number of unused bits) is to be executed, in accordance with the number of bits available for encoding sub-vectors in vector quantization.

In this way, by switching between encoding of the codebook number and encoding of the number of unused bits in accordance with the number of bits available for encoding, it is possible to perform encoding according to the number of bits available for encoding in multi-rate lattice vector quantization, so it is possible to reduce the number of bits for encoding. Thus, according to the present embodiment, it is possible to reduce the number of bits for encoding in multi-rate lattice vector quantization.

According to the present embodiment, even when the code conversion-targeted sub-vector for an unused-bit indicator is a sub-vector different from the last sub-vector (for example, SV8) (in other words, when the order of encoding is changed), encoding apparatus 300 can accurately determine the number of unused bits according to the number of wasted bits that can occur as a result of a change of the order of encoding.

According to the present embodiment, decoding apparatus 400, for example, can identify encoding information on the code conversion-targeted sub-vector in accordance with parameters such as the number of bits used to encode and decoded information (for example, codebook indicators of sub-vectors different from the code conversion-targeted sub-vector). Thus, for example, a signal for switching between encoding of codebook indicators and encoding of the number of unused bits (for example, a flag or switching-specific control information) does not need to be provided from encoding apparatus 300 to decoding apparatus 400.

The embodiments of the present disclosure have been described above.

In an embodiment of the present disclosure, a codebook list is not limited to an example shown in FIG. 1, and the values of the codes and the number of bits used (or the total number of bits used) by the codebook indicators and the codevector indices in the codebooks may be other values. The above-described thresholds may be set according to the codebook list applied to encoding and decoding.

For example, in FIG. 1, the ratio of the number of bits used by the codebook indicators to the total number of bits used in each codebook is ⅕ (in other words, when the divisor in a case where a remainder is used is five) has been described; however, the configuration is not limited thereto.

In the above-described embodiments, a case where the number of sub-vectors into which an input signal S(f) is split is eight has been described. The number of sub-vectors into which an input signal S(f) is split is not limited to eight.

In the above-described embodiments, in an example, a case where an input signal is split into a plurality of sub-vectors in a frequency domain has been described; however, the configuration is not limited thereto. An input signal may be split into a plurality of sub-vectors in a time domain. In a case of a time domain, for example, a specific sub-vector (in an example, the third sub-vector or the last sub-vector from the first) of a plurality of sub-vectors arranged in the time domain may be set for the above-described code conversion-targeted sub-vector SVd. In this way, in an embodiment of the present disclosure, when an input signal is split into sub-vectors with a constant length in any one of a frequency domain and a time domain, a sub-vector at any position (for example, a sub-vector at a specific position (for example, a third position) or the last sub-vector) of sub-vectors arranged may be set for the code conversion-targeted sub-vector SVd.

In the above-described embodiments, vector quantization is not limited to AVQ and may be another method.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

In addition to data communication via cellular systems, wireless LAN systems, communication satellite systems and/or the like, communication includes data communication via a combination of these systems.

Further, the communication apparatuses include devices, such as controllers and sensors, to be connected to or linked to a communication device that executes a communication function described in the present disclosure. Controllers or sensors are included, for example, each of which is configured to generate a control signal and/or a data signal used by the communication device that executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

An encoding apparatus according to an embodiment of the present disclosure includes: quantization circuitry, which, in operation, generates quantization parameters including information on a codebook for vector quantization; and control circuitry, which, in operation, configures, in encoding of a difference between a number of available bits for quantizing a targeted sub-vector and a number of bits of the quantization parameters of the targeted sub-vector, the number of available bits depending on a condition.

In the embodiment of the present disclosure, the control circuitry classifies a plurality of sub-vectors into a first group including a sub-vector having a lower frequency than the targeted sub-vector and a second group including the targeted sub-vector and a sub-vector having a higher frequency than the targeted sub-vector, and an encoding order of the targeted sub-vector is configured at a last of a plurality of the sub-vectors included in the second group.

In the embodiment of the present disclosure, the control circuitry updates the number of available bits based on the condition on a first number and the condition on a second number, the first number being a number of consecutive sub-vectors of which the quantization parameters indicate null vectors among the plurality of sub-vectors different from the targeted sub-vector in the second group, and the second number being a reminder obtained by dividing the number of available bits by five.

In the embodiment of the present disclosure, the control circuitry adds the first number to the number of available bits when a remainder obtained by dividing a sum of the first number and the second number by five is zero, adds a value obtained by adding one to the first number to the number of available bits when the remainder obtained by dividing the sum of the first number and the second number by five is four, and adds a value obtained by subtracting the second number from five to the number of available bits when the remainder obtained by dividing the sum of the first number and the second number by five is different from zero and four.

In the embodiment of the present disclosure, the control circuitry adds a value obtained by adding one to the first number to the number of available bits when a remainder obtained by dividing a sum of the first number and the second number by five is four, adds the first number to the number of available bits when the remainder obtained by dividing the sum of the first number and the second number by five is different from four, and subtracts a third number from the number of available bits after the first number or the value obtained by adding one to the first number is added, when the third number is greater than zero, the third number being a reminder obtained by dividing, by five, the number of available bits after the first number or the value obtained by adding one to the first number is added.

In the embodiment of the present disclosure, the targeted sub-vector is a third sub-vector in ascending order in a frequency domain or a third sub-vector in order starting with an earliest in a time domain, among eight sub-vectors.

A decoding apparatus according to an embodiment of the present disclosure includes: control circuitry, which in operation, configures, in decoding of encoded data of a difference between a number of available bits for encoding a targeted sub-vector in vector quantization and a number of bits of quantization parameters including information on a codebook for the vector quantization of the targeted sub-vector, the number of available bits depending on a condition; and inverse quantization circuitry, which in operation, performs inverse vector quantization based on a result of the decoding.

In an encoding method according to an embodiment of the present disclosure, an encoding apparatus generates quantization parameters including information on a codebook for vector quantization, and configures, in encoding of a difference between a number of available bits for quantizing a targeted sub-vector and a number of bits of the quantization parameters of the targeted sub-vector, the number of available bits depending on a condition.

In a decoding method according to an embodiment of the present disclosure, a decoding apparatus configures, in decoding of encoded data of a difference between a number of available bits for encoding a targeted sub-vector in vector quantization and a number of bits of quantization parameters including information on a codebook for the vector quantization of the targeted sub-vector, the number of available bits depending on a condition, and performs inverse vector quantization based on a result of the decoding.

The disclosure of Japanese Patent Application No. 2021-195488, filed on Dec. 1, 2021, including the specification, drawings and abstract, is incorporated herein by reference in its entirety.

INDUSTRIAL APPLICABILITY

An embodiment of the present disclosure is useful in encoding systems and the like.

REFERENCE SIGNS LIST

100, 300 Encoding apparatus
101 Multiplier
102 Subtracter
103 De-emphasizer

104 DCT section

105 AVQ encoder

106, 205 Floating bits manager

107, 206 Inverse DCT section

108, 202, 301, 401 Sub-vector identifier

109, 203 Code converter

110 Multiplexer

200 Decoding apparatus

201 Separator

204 AVQ decoder

The invention claimed is:

1. An encoding apparatus comprising:

quantization circuitry, which, in operation, generates, for each of a plurality of sub-vectors of a signal, quantization parameters including a codebook index indicating a codebook used for vector quantization and a code vector index indicating a code-vector used for the vector quantization; and control circuitry, which, in operation, divides the plurality of sub-vectors into a first group not including a targeted sub-vector and a second group including the targeted sub-vector, encodes the quantization parameters of the first group of sub-vectors, in encoding the quantization parameters of the second group of sub-vectors, when calculating a number of unused bits that is a difference between a number of available bits for encoding the quantization parameters of the targeted sub-vector and a number of bits necessary for encoding the quantization parameters of the targeted sub-vector, updates the number of available bits based on a Number of Consecutive Null Vectors (NCNV), indicating a number of null vectors that are consecutive among two or more sub-vectors except the targeted sub-vector within the second group and/or a number of Remainer Bits (RB), that is a remainder of five of the number of available bits, calculates the number of unused bits of the targeted sub-vector by using the updated number of available bits, and encodes the calculated number of unused bits of the targeted sub-vector.

2. The encoding apparatus according to claim 1, wherein an encoding order of the targeted sub-vector is configured at a last of two or more sub-vectors included in the second group.

3. The encoding apparatus according to claim 1, wherein the control circuitry, in operation, updates a value of the RB to 0 after updating the number of available bits.

4. The encoding apparatus according to claim 1, wherein the control circuitry, in operation, adds a value of the NCNV to the number of available bits before the update when a remainder obtained by dividing a sum of the value of the NCNV and the value of the RB by five is zero, adds a value obtained by adding one to the value of the NCNV to the number of available bits before the update when the remainder obtained by dividing the sum of the value of the NCNV and the value of the RB by five is four, and adds a value obtained by subtracting the value of the RB from five to the number of available bits before the update when the remainder obtained by dividing the sum of the value of the NCNV and the value of the RB by five is different from zero and four.

5. The encoding apparatus according to claim 1, wherein the control circuitry, in operation, adds a value obtained by adding one to the value of the NCNV to the number of available bits before the update when a remainder obtained by dividing a sum of the value of the NCNV and the value of the RB by five is four, adds the value of the NCNV to the number of available bits before the update when the remainder obtained by dividing the sum of the value of the NCNV and the value of the RB by five is different from four, and when a recalculated value of the RB, which is a remainder of five of the number of available bits after a number obtained by adding one to the value of the NCNV or the value of the NCNV is added, is greater than zero, subtracts the recalculated value of the RB from the number of available bits after the value obtaining by adding one to the value of the NCNV or the value of the NCNV is added to the number of available bits.

6. The encoding apparatus according to claim 1, wherein the targeted sub-vector is a third sub-vector in ascending order in a frequency domain or a third sub-vector in order starting with an earliest in a time domain, among eight sub-vectors that are included in the plurality of sub-vectors.

7. An encoding method, comprising:

generating, by an encoding apparatus, for each of a plurality of sub-vectors, quantization parameters a codebook index indicating a codebook used for vector quantization and a code vector index indicating a code-vector used for the vector quantization; and dividing the plurality of sub-vectors into a first group not including a targeted sub-vector and a second group including the targeted sub-vector, encoding the quantization parameters of the first group of sub-vectors, in encoding the quantization parameters of the second group of sub-vectors, when calculating a number of unused bits that is a difference between a number of available bits for encoding the quantization parameters of the targeted sub-vector and a number of bits necessary for encoding the quantization parameters of the targeted sub-vector, updating the number of available bits based on a Number of Consecutive Null Vectors (NCNV) indicating a number of null vectors that are consecutive among two or more sub-vectors except the targeted sub-vector within the second group and/or a number of Remainer Bits (RB), that is a remainder of five of the number of available bits, calculating the number of unused bits of the targeted sub-vector by using the updated number of available bits, and encoding the calculated number of unused bits of the targeted sub-vector.

8. The encoding method according to claim 7, wherein an encoding order of the targeted sub-vector is configured at a last of the two or more sub-vectors included in the second group.

9. The encoding method according to claim 7, comprising:

updating a value of the RB to 0 after updating the number of available bits.

10. The encoding method according to claim 7, comprising:

adding a value of the NCNV to the number of available bits before the update when a remainder obtained by dividing a sum of the value of the NCNV and the value of the RB by five is zero, adding a value obtained by adding one to the value of the NCNV to the number of available bits before the update when the remainder obtained by dividing the sum of the value of the NCNV and the value of the RB by five is four, and adding a value obtained by subtracting the value of the RB from five to the number of available bits before the update when the remainder obtained by dividing the sum of the value of the NCNV and the value of the RB by five is different from zero and four.

11. The encoding method according to claim 7, comprising:

adding a value obtained by adding one to the value of the NCNV to the number of available bits before the update when a remainder obtained by dividing a sum of the value of the NCNV and the value of the RB by five is four, adding the value of the NCNV to the number of available bits before the update when the remainder obtained by dividing the sum of the value of the NCNV and the value of the RB by five is different from four, and when a recalculated value of the RB, which is a remainder of five of the number of available bits after a number obtained by adding one to the value of the NCNV or the value of the NCNV is added, is greater than zero, subtracting the recalculated value of the RB from the number of available bits after the value obtaining by adding one to the value of the NCNV or the value of the NCNV is added to the number of available bits.

12. The encoding method according to claim 7, wherein the targeted sub-vector is a third sub-vector in ascending order in a frequency domain or a third sub-vector in order starting with an earliest in a time domain, among eight sub-vectors that are included in the plurality of sub-vectors.

* * * * *